United States Patent
Smith

(10) Patent No.: US 9,931,587 B2
(45) Date of Patent: Apr. 3, 2018

(54) ENHANCED VORTEX FLUID TREATMENT APPARATUS, SYSTEM, AND METHOD FOR SEPARATING SOLIDS FROM SOLIDS-CONTAINING LIQUIDS

(71) Applicant: Amarillo Equities Inc., Calgary (CA)

(72) Inventor: Donald R. Smith, Strathmore (CA)

(73) Assignee: Amarillo Equities Inc. (CA)

( * ) Notice: Subject to any disclaimer, the term of this patent is extended or adjusted under 35 U.S.C. 154(b) by 268 days.

(21) Appl. No.: 14/720,912

(22) Filed: May 25, 2015

(65) Prior Publication Data

US 2015/0343331 A1    Dec. 3, 2015

Related U.S. Application Data

(63) Continuation-in-part of application No. 14/304,581, filed on Jun. 13, 2014, now abandoned.

(30) Foreign Application Priority Data

Jun. 3, 2014  (CA) ...................................... 2853391

(51) Int. Cl.
   *B01D 21/24*   (2006.01)
   *B01D 21/26*   (2006.01)
   *C02F 1/00*    (2006.01)

(52) U.S. Cl.
   CPC ...... *B01D 21/2411* (2013.01); *B01D 21/2472* (2013.01); *B01D 21/26* (2013.01); *C02F 1/00* (2013.01); *C02F 2001/007* (2013.01)

(58) Field of Classification Search
   CPC ............ B01D 21/0024; B01D 21/0087; B01D 21/10; B01D 21/2411; B01D 21/2472;
   (Continued)

(56) References Cited

U.S. PATENT DOCUMENTS 1,992,261 A * 2/1935 Traudt ................... B01D 41/02
                                                      366/137
2,264,403 A * 12/1941 Payne .................. B01D 21/009
                                                      210/512.1

(Continued)

FOREIGN PATENT DOCUMENTS

GB         2352409 A      1/2001

*Primary Examiner* — David C Mellon
(74) *Attorney, Agent, or Firm* — Gowling WLG (Canada) LLP; D. Doak Horne

(57) ABSTRACT

A settling tank apparatus for removing solids from a solids-containing fluid, having a vertical cylindrical portion and a bottom portion having a downwardly-extending substantially torispherical, ellipsoidal, hemispherical or frusto-conical shaped curved interior surface. A jetting fluid source is provided in a lower region of the tank, preferably in the bottom of the tank, which directs a jetting fluid in a tangential direction in a plane substantially perpendicular to said longitudinal axis of the tank, to enhance rotational swirling of a created vortex in the bottom of tank when solids are drained therefrom, to thereby reduce deposition and build up of settled solids on the curved interior of the bottom of the tank. A system incorporating a plurality of tanks of such design and a method for removing solids from a solids-containing fluid using a tank of such design, is further disclosed.

22 Claims, 13 Drawing Sheets

(58) Field of Classification Search
CPC . B01D 21/26; B01D 21/267; C02F 2001/007; B04C 5/04; B04C 5/081; B04C 5/26
See application file for complete search history.

(56) References Cited

U.S. PATENT DOCUMENTS

| | | | | |
|---|---|---|---|---|
| 3,204,772 A * | 9/1965 | Ruxton | ................... | E21B 43/34 |
| | | | | 209/731 |
| 3,499,270 A * | 3/1970 | Paugh | ................... | B01D 45/12 |
| | | | | 418/5 |
| 3,947,364 A * | 3/1976 | Laval, Jr. | ................... | B04C 5/04 |
| | | | | 210/512.1 |
| 4,151,083 A * | 4/1979 | Dove | ....................... | B04C 5/04 |
| | | | | 162/55 |
| 4,747,962 A | 5/1988 | Smisson | | |
| 4,840,732 A * | 6/1989 | Rawlins | ................. | B01D 17/00 |
| | | | | 210/306 |
| 4,908,049 A * | 3/1990 | Yoshida | ................. | B04C 5/081 |
| | | | | 209/11 |
| 5,705,060 A * | 1/1998 | Robberts | ............... | B01F 5/0057 |
| | | | | 210/198.1 |
| 6,793,814 B2 | 9/2004 | Fout et al. | | |
| 2008/0169237 A1* | 7/2008 | Schrader | ............ | B01D 21/2411 |
| | | | | 210/512.2 |
| 2008/0230458 A1* | 9/2008 | Lean | ...................... | B01D 45/12 |
| | | | | 210/195.1 |
| 2010/0193414 A1* | 8/2010 | Arefjord | ............ | B01D 21/2411 |
| | | | | 210/86 |
| 2013/0284026 A1* | 10/2013 | Warncke | ............ | B01D 19/0057 |
| | | | | 96/216 |

* cited by examiner

ENHANCED VORTEX FLUID TREATMENT APPARATUS, SYSTEM, AND METHOD FOR SEPARATING SOLIDS FROM SOLIDS-CONTAINING LIQUIDS

FIELD OF THE INVENTION

The present invention relates to settling or clarification tanks for treating fluids, and more particularly treating contaminated fluids including water, and more particularly relates to a novel settling tank, a system of settling tanks having novel features, and a method of operating a settling tank or tanks having such features, all for treating and removing solids from solids-containing liquids.

BACKGROUND OF THE INVENTION AND DESCRIPTION OF PRIOR ART

Clarification tanks (aka settlement tanks) are used in a variety of applications, including removal of solids from sewage and removal of drill tailings and heavier-than water compounds present in drilling fluids to permit recycled use of water that may be present in such drilling fluids.

A common design for fluid settling systems is the use of rectangular vessels that are segmented into a series of smaller compartments by dividers or weirs that restrict the forward movement of the fluids being circulated. Areas of reduced fluid velocity conducive to the settling of solids, or settlement compartments, are thereby created. The physical shape of such rectangular settling compartments present a number of inefficiencies. In particular, the right angle corners of rectangular shaped compartments becomes an effective trapping mechanism where fluid velocity is adversely affected creating an area prone to solids deposition. The deposition of the solids in these corners effectively reduces the working volume of the chamber or compartment and thus reduces the overall efficiency of the entire settling tank. Furthermore, as these solids collect, the weight of successive solids collecting on top of other solids compresses these settled solids making their removal, labor and time intensive. Further compounding the ineffectiveness of the rectangular compartments is the addition of suction lines and other internal plumbing that also creates traps, hampering the effectiveness of the settling.

CA 2,485,875 entitled "Settling Tank and Method for Separating a Solids-Containing Fluid" and granted to the within inventor, teaches a generally rectangular settling tank, having an inlet and an upper outlet at opposite ends of an individual tank so that the fluid passes generally in a first direction from the inlet toward the upper outlet. A backwash fluid source, typically a nozzle, for directing backwash fluid in a second direction which is substantially opposite such first direction, is provided. It is believed the opposite directions 182,192 of flow of the solids-containing fluid 162 and the backwash fluid 190 provides or causes a rolling action or rolling fluid flow, indicated by arrow 194 in FIG. 16 therof, and may also increase the residence time of the solids-containing fluid 162 within the settling compartment 168, which may enhance the settling of the solids therein. The rectangular shape of the design and the presence of internal plumbing, however, creates the potential for traps and solids collection.

All clarifying/settlement tanks, including rectangular systems, used for separating solids from solids-containing liquids, will typically have the problem, after operation of a period of time, of build-up of precipitated solids on the bottom of the tank. Such build-up, if permitted to continue, detrimentally reduces the volume of the settling tank and thus the tank's speed and capacity to clarify and separate solids from quantities of solids-containing liquids. The solids need be removed from the tank, and transported to an area of storage and concentration, so operation of the clarification tank may continue.

One means/method of removing the solids from the tank is, of course, to cease the clarification operation and access the tank from the top to collect the solids and remove them from the tank. Detrimentally, however, clarification tanks typically run in continuous as opposed to batch mode, and continually separate solids from an incoming solids-containing stream. Thus having to stop such continuous operation for removal of solids from the bottom of the tank is not only time consuming and labour intensive, but further causes complete cessation of all upstream supply of solids-containing fluids until the precipitated solids have been removed from the tank and the tank brought back into operation. To deal with this problem additional bypass tanks are employed, and shut-downs for solids removal from each are scheduled in a "staggered" manner, to allow continual uninterrupted treatment of a solids-containing fluid being generated upstream. Such additional processing capacity, and operation of the units in a "staggered manner", adds greater capital cost and expense.

An alternative known manner and apparatus for allowing removal of sediment from settlement tanks but allowing for continued clarification of fluids in the tanks, but which adds considerable cost and mechanical complexity, is to provide a frusto-conical base and a rotating mechanical arm or arms ("rakes") which continually "sweeps" the frusto-conical interior surface of any settled sediment and continually directs such sediment downwardly into a solids outlet, situated centrally and co-axially within the frusto-conical surface.

EP Patent Application 0010395 is an example of one such sedimentation tank apparatus employing a rotating mechanical rake. Tank 10 of EP '395 comprises a cylindrical outer wall 11, a conical bottom wall 12, and a centrally located discharge sump outlet 14, as seen from FIG. 1 thereof. A motor drive mechanism 17 is provided for driving a central rotatable drive shaft 18 which is mounted to a rotary rake structure 20 for moving settled underflow to sump 14 on the frusto-conical bottom of tank 10.

EP '395 further teaches a submerged inlet feed structure 27 comprising a pair of superimposed upper and lower branches 28, 29 which lead tangentially into upper and lower fed channels 25, 26. In such manner the liquid influent is caused to flow inwardly in opposite directions from channels 25, 26 to shear in a plane along the entire length of the channels at twice the velocity. In the shear zone B the energy of the two steams is converted into random turbulence.

Along similar lines is U.S. Pat. No. 3,006,474, also naming the same inventor as EP '395, entitled "Method and Means for converting the Kinetic Energy of a Fluid Stream into Random Turbulence", having rake arms 74,75 which deliver sludge over the tank bottom 49 into a conical sump 76 for withdrawal through discharge pipe 77.

U.S. Pat. No. 6,793,814 entitled "Clarifying Tank" provides a cylindrical tank, having a frusto-conical bottom, and a centrally-located solids outlet 150 therein. In one embodiment a conical auger 160 is provided, rotated about shaft 180, to compress solids in the bottom frusto-conical portion of the tank and move them toward solids outlet 150. In the embodiment shown in FIG. 3 fluid enters the tank through tangential fluid inlet 410 [situated above the frusto-conical portion (ref. FIG. 3)] creating a vortex (col. 5, lines 52)

which tends to move solid particles within the fluid toward the wall of the tank, so that fluid which remains nearer the center of tank 310 will thus become relatively free of solid particles, and fluid outlet 440 is provided to permit removal of this substantially clean fluid from the center of tank 310. Tank 310 also includes a static coalescing spiral 500 having a series of flights 510 inclined upward and extending into the rotating fluid within the tank, and runs in the opposite direction of the flow of fluid. Static spiral 500 acts to coalesce smaller solid particles into larger particles that settle out of the fluid at increased rate.

U.S. Pat. No. 857,626 to a "Water Tank" teaches a cylindrical tank having a hemi-ellipsoid bottom 2. By the arrangement of a blow-off pipe 23 and a valve 24 in the bottom of the inlet pipe 15, all mud and other sediment in the water will settle in the bottom of the inlet pipe and by opening the valve 24, such mud may be readily blown out by the force of the water rushing through the valve, and it thereby becomes unnecessary to empty the entire tank to remove the sediment as in the case where the sediment is allowed to settle in the bottom of the tank, instead of in the bottom of the inlet pipe.

The foregoing background information is provided for the purpose of making known information believed by the applicant to be of possible relevance to the present invention. No admission is necessarily intended, nor should be construed, that any of the preceding information, or the reference in the drawings to "prior art" constitutes relevant prior art against the present invention.

SUMMARY OF THE INVENTION

In order to avoid some of the drawbacks of the prior art designs and provide a settlement tank which has little predisposition to the problem of solids buildup in the base of the tank but further avoids having to employ mechanical rake means and other mechanical means of sediment removal as conducted in the prior art, the present invention provides a novel settling tank, a system of settling tanks, and method for operating settling tanks, wherein precipitated solids lying on the bottom of the tank are substantially removed during draining of the tank without having to add mechanical rake means.

Specifically, the present invention provides a specially-configured settling tank having a bottom, the bottom having a downwardly extending uniformly-curved profile such as a downwardly-extending frusto-conical, hemispherical, torispherical, or elliptical profile, which advantageously avoids discontinuities within the surface of the bottom as would occur if a downwardly-extending pyramidal shaped bottom, for example, was employed. The bottom of the tank of the present invention has at a lowermost extremity thereof a centrally-located drain for draining solids which precipitate to the bottom of the tank. The drain, when opened, forms a rotational vortex within fluid remaining in the bottom of the tank proximate the drain. The so-formed rotational vortex, due to the increased speed of the fluid within the so-formed vortex, tends to entrain within it some (but not all) of the precipitated solids lying on the bottom of the vessel proximate the drain. Such solids are then, having been thereby rendered mobile and returned into solution within the vortex of fluid proximate the drain, drawn out of the vessel upon passage of such fluid out the drain.

The present invention adds the important feature of a jetting fluid source adapted and configured to inject fluid in a manner to increase in the speed of rotation of the vortex and further augment the size of the created vortex, thereby substantially augmenting and improving the effect of the vortex in drawing precipitated solids from the bottom of the tank and from a greater surface area of the bottom of the tank into the drain, thus better and more completely removing precipitated solids lying on the bottom of the tank and preventing build-up thereof in the bottom of the tank.

Specifically, the present invention further provides a jetting fluid source situated in a lower region of the tank, preferably in the bottom of the tank. The jetting fluid source, at least when the tank is being drained, directs a jetting fluid into the tank in a tangential direction and in a plane substantially perpendicular to said longitudinal axis of the tank, to advantageously in such manner magnify the rotational speed of the created vortex in the bottom of the tank as well as its size and thus magnify the "swept" area on the frusto-conical, hemispherical, torispherical, or elliptical bottom of the tank. The resulting augmentation of the speed and size of the vortex in the bottom of the tank by the fluid jetting source thereby allows, to a substantially greater extent, more entrainment within the augmented vortex of precipitated solids otherwise lying on the bottom of the tank, so as to "sweep" them from the bottom of the tank and thereby increase the quantum of solids which become drained from the tank with fluids which exit the solids outlet (ie. sump or drain of the tank), thereby reducing the quantum and build-up of settled solids on the curved interior of the bottom of the tank.

It is noted that to best "sweep" precipitated solids from the bottom of the tank using the jetting fluid source and to cause said fluid to rotate in the bottom of the tank about a longitudinal axis of the tank in a vortex manner, it is preferable that the settlement tank possess a downwardly-extending bottom having a smooth and uniformly curved surface. Preferably the bottom is substantially without discontinuities therein which would otherwise disrupt the spinning vortex and create undesirable turbulence in the fluid in the bottom of the tank which would detract from the enhancement and augmentation of such vortex, which vortex upon being thereby enhanced by the jetting fluid source and increased in both size and speed, is better able to entrain therein solids which may have settled to the bottom of the tank, which solids are then drained from the tank when the solids outlet is opened or partially opened.

A tank bottom of a downwardly-extending frusto-conical, hemispherical, torispherical, or elliptical profile which has at is lowermost extremity a centrally-located solids outlet co-axially located about the longitudinal axis are profiles best adapted to best meet the objective of avoiding disruption of the spinning of the vortex by providing a profile devoid of discontinuities, and further eliminate areas which may otherwise be difficult for a vortex spinning about the longitudinal axis to extend into and thus "sweep". Downwardly-extending curved sides of the bottom of the tank (as possessed by frusto-conical, hemispherical, torispherical, or elliptical profiles) are thus then able to best be uniformly contacted by the rotating vortex and rotating fluid therein which co-axially spins about the centrally-located drain when augmented by the jetting fluid, to thereby "sweep" the sloped sides of the bottom of the tank of precipitated solids.

A tank having flat bottom, such as for example a right cylindrical tank with a base perpendicular to the side walls of the tank and thus not downwardly extending nor uniformly curved is less desirable, even with a jetting fluid source causing rotation about the longitudinal axis of the tank, since there will in such configuration be a circumferentially-extending discontinuity formed between the cylindrical sides of the tank and the flat circular bottom of the tank. Any created vortex surrounding a drain will in such tank geometery primarily extend upwardly from the base into the fluid/tank and insufficiently extend into the junction area between the cylindrical side walls and the circular base, and thus insufficiently (or not at all) sweep the bottom of the tank in such junction area (area of discontinuity).

Likewise, to uniformly contact the bottom of the tank with the vortex, it is desirable that the drain be located centrally within the bottom of the tank, so that downwardly sloping sides of the bottom of the tank which uniformly surround the central drain will be uniformly contacted by a typically symmetrical vortex, and the vortex swirl is thus evenly distributed and co-axial about the drain and thus be able to uniformly "sweep" the bottom of the tank.

It is noted that in the specific case of frusto-conical shaped bottoms (as opposed to torispherical or hemispherical bottoms whose depth is determined by geometrical relation), by employing a very narrow frusto-conical shaped bottom (i.e., having a very high height/diameter ratio), such bottom profiles tend to have little or no solids collecting or building up on the steeply sloped bottom. In such high ratio height/diameter frusto-conical tanks providing a jetting fluid source to augment the vortex would serve little purpose. However, with settling tanks having a high height/diameter ratio, the height of the settling tank necessarily increases due to the increased height of the frusto-conical bottom but does not proportionately increase the volume of the tank, and thus such high ratio height/diameter bottom tanks are less economical and use more material (and are thus more costly) for containing the same volume of fluid.

Advantageously, the present invention allows using less costly low height/diameter ratio tanks, which heretofore were unsatisfactory due to high solids buildup inherent in such designs, by employing a jetting fluid to augment a vortex formed about a centrally-located solids outlet. Settling tanks can thus be reduced in height (i.e., be used with a lower height/diameter relation), and thereby be less costly to make and hold proportionately more fluid for amount of material expended in manufacture, with no sacrifice in the ability to effectively remove solids from the bottom of the tank using the jetting fluid source and manner of introduction of such jetting fluid of the present invention).

Accordingly, in a first broad non-limiting embodiment the present invention comprises a novel yet relatively simple tank apparatus for separating solids from a solids-containing fluid, which does not employ mechanical rake means, comprising:

(a) a substantially cylindrical settling tank having a vertical longitudinal axis, further having:
  (i) a substantially cylindrical upper portion with a cylindrical interior surface;
  (ii) a bottom, located below said cylindrical portion, downwardly-extending and having a smooth curved interior surface substantially without discontinuities therein which would otherwise obstruct or disrupt rotation of fluid within said bottom in a plane perpendicular to said longitudinal axis;
  (ii) a fluid inlet, in fluid communication with an interior of said tank, for directing the solids-containing fluid into the tank;
  (iii) a solids outlet, disposed proximate a lowermost extremity of said bottom, for allowing draining of solids situated on said curved interior surface of said tank;
  (iv) a cleaned fluid outlet, disposed in said cylindrical upper portion of said tank and in fluid communication with said interior of said tank in said upper cylindrical portion, for removing fluids having reduced quantities of solids entrained therein from said tank; and (b) a jetting fluid source, situated in a lower region of said tank in or proximate said bottom and above said solids outlet, for directing a jetting fluid into said tank in a plane substantially perpendicular to said longitudinal axis and in a direction substantially tangential to said cylindrical interior surface or said curved interior surface, to thereby introduce or augment rotational swirl of fluid in said bottom of said tank in said plane and about said longitudinal axis of said tank when solids are drained from said tank via said solids outlet.

In one embodiment the fluid inlet and the jetting fluid source comprise two separate conduits, separately supplying respectively an inlet fluid and a jetting fluid, to said tank.

In another embodiment, the fluid inlet and the jetting fluid source are one and the same. Specifically, a single nozzle is provided proximate the bottom of the tank or within the bottom of the tank, and directs the inlet fluid (which also serves as the jetting fluid) into said tank in a plane substantially perpendicular to said longitudinal axis and in a direction and at a location substantially tangential to said cylindrical interior surface or said curved interior surface, to thereby introduce or augment rotational swirl of fluid in said bottom about said longitudinal axis of said tank when fluid is drained from the solids outlet.

In a preferred embodiment, the jetting fluid source is situated directly in the bottom of the tank, namely coupled to, and in fluid communication with, said bottom of said tank, in order to be closest to the vortex so as to thereby most effectively augment the spinning of the vortex co-axially about the drain to better entrain solids therein.

All parts of the northern hemisphere, such as North America, are located north of the equator. Due to the coriolis effect of the spinning earth on its axis, vortexes in large quiescent bodies of fluid situated in North America will naturally swirl in a counter-clockwise direction.

Thus, and advantageously, in a preferred embodiment of the present invention, in order to best augment the swirling and rotation of the vortex created in a large settling tank situated in North America which has a solids outlet situated centrally therein and which naturally, for sufficiently large and sufficiently quiescent tanks, forms a counter-clockwise vortex of swirling fluid about said solids outlet when fluids and entrained solids are drained therefrom, the jetting fluid source in the tank of the present invention directs and is adapted to direct a jetting fluid in a counter-clockwise direction within a lower region of said tank (preferably in the bottom of the tank when viewed from above looking downwardly on said interior surface of said bottom of the tank), so as to best assist in creation of, or enhance the spinning of, the counter-clockwise vortex of fluid in said bottom of said tank to thereby better entrain solids which have settled to the bottom of the tank to then be entrained within the swirling fluid at the solids outlet and flow out of the tank via the solids outlet.

It is preferable that both the fluid inlet into the tank and the cleaned fluids outlet from the tank not negate or disrupt the spinning of the vortex in the bottom of the tank and otherwise counter-act the "sweeping" effect of the vortex. Accordingly, in one embodiment, the solids-containing fluid inlet is separate from the jetting fluid source, situated above the bottom of the tank, and injects (in the case of the solids-containing fluid inlet) fluid in a non-tangential matter into the tank. Alternatively, or in addition, the cleaned fluid outlet may be disposed in an upper region of the tank, and withdraws clarified fluid from the tank preferably in a non-tangential manner to avoid creation of a vortex or rotation of fluids in an upper region of the tank, where quiescent fluid is generally desired to promote settling of solids downwardly toward the bottom of the tank.

In a preferred embodiment, the jetting fluid source comprises a nozzle for injecting the fluid at a velocity. However, any manner of introduction of fluid which permits injection of fluid at high velocities in a tangential direction to the curvature of the interior surface of the tank is contemplated. Many configurations of the jetting fluid source to accomplish such objective will now occur to persons of skill in the art, and are not elaborated on further.

In a further embodiment of the invention, the invention comprises a system of tanks of similar configuration, for separating solids from a solids-containing fluid. Thus in a further embodiment, the invention comprises:

(a) a first, substantially vertical, cylindrical settling tank, having:
   (i) an upper, substantially cylindrical portion;
   (ii) a bottom, having a downwardly-extending substantially torispherical, ellipsoidal, hemispherical or frusto-conical shaped curved interior surface extending downwardly from said upper cylindrical portion;
   (iii) a fluid inlet, in fluid communication with an interior of said tank, to allow ingress of said solids-containing fluid into said interior of said first tank;
   (iv) a solids outlet, in fluid communication with said bottom of said first tank, disposed centrally of the first tank in said bottom of the first tank at a lowermost extremity thereof, for draining solids from said bottom of said first tank;
   (v) a cleaned fluid outlet, disposed in said cylindrical upper portion of said first tank and in fluid communication with said interior of said first tank in said upper cylindrical portion, for removing fluids having reduced quantities of solids entrained therein from said tank; and
   (vi) a jetting fluid source, situated in a lower region of said first tank but above said solids outlet, for directing a jetting fluid in a plane substantially perpendicular to a longitudinal axis of said first tank and in a direction substantially tangential to a curved interior surface of said first tank; and (b) a second, substantially vertical, cylindrical settling tank, situated proximate to said first settling tank, having:
   (i) an upper, substantially cylindrical portion;
   (ii) a bottom, having a downwardly-extending substantially torispherical, ellipsoidal, hemispherical or frusto-conical shaped curved interior surface extending downwardly from said upper cylindrical portion;
   (iii) a fluid inlet, in fluid communication with an interior of said second tank, to allow ingress of said solids-containing fluid into said interior of said second tank;
   (iv) a solids outlet, in fluid communication with said bottom of said second tank, disposed centrally of the second tank at a lowermost extremity thereof, for draining solids from said bottom of said second tank;
   (v) a cleaned fluid outlet, disposed in said cylindrical upper portion of said second tank and in fluid communication with said interior of said second tank in said upper cylindrical portion, for removing fluids having reduced quantities of solids entrained therein from said tank; and
   (vi) a jetting fluid source, situated in a lower region of said second tank but above said solids outlet, for directing a jetting fluid in a plane substantially perpendicular to a longitudinal axis of said second tank and in a direction substantially tangential to a curved interior surface of said second tank.

In a further refinement of the above settling tank system, and preferably, the jetting fluid source in each of said first tank and said second tank is coupled to, and in fluid communication with, said bottom of said respective first and second tank, so as to best direct the jetting fluid into the bottom of said tanks: (i) in a direction substantially tangential to said curved interior surface, and; (ii) in a plane perpendicular to said longitudinal axis of said first and second tanks, and best augment the spinning of a vortex in the bottom of the tank when solids are being drained therefrom.

Preferably in such above system, the first and second tank are arranged in "series", so as to successively and progressively clarify fluid as the fluid passes from the first tank to the second tank. Accordingly, in such embodiment the cleaned fluid outlet of the first tank is in fluid communication with said fluid inlet of said second tank so as to permit the cleaned fluid outlet of the first tank to supply fluids having reduced quantities of solids entrained therein to said fluid inlet of said second tank and progressively thereby remove solids from such fluid stream.

Due to the propensity of solids to settle, it is preferable that the fluid inlet in each of the first tank and said second tank be situated in a lower region of each of said first and second tank, respectively, and fluid enters each of said first tanks and said second tank in said lower region thereof so that solids therein will most quickly and directly settle toward the bottom of the tank. Of course, and conversely, as fluid toward the upper region of the tank will tend, due to the settling of solids, to be free of solids, the clean water outlet from the first tank is preferably situated in the upper region of the first tank, and will be in fluid communication with the fluid inlet in the second tank, situated as indicated above, in a lower region thereof.

Preferably the jetting fluid source in the first tank is in fluid communication with, and said jetting fluid supplied to the jetting fluid source in said first tank comes from, the solids-containing fluid supplied to the fluid inlet of said first tank.

Likewise preferably, the jetting fluid source in the second tank is in fluid communication with, and the jetting fluid supplied to the jetting fluid source in said second tank comes from, the solids-containing fluid supplied to said fluid inlet of said first tank.

In a further refinement of the system of the present invention, full or partial recirculation of fluids is provided to thereby obtain additional successive clarification of a given quantum of solids-containing fluids. Specifically, in a preferred embodiment, the settling tank system is provided with recirculation means whereby the fluid inlet on the first tank receives fluid from the cleaned fluid outlet of the second tank or from a cleaned fluid outlet of a subsequent additional tank downstream from said second tank.

The invention, in another aspect, comprises a method for separating solids from a solids-containing fluid, using a jetting fluid source in the manner described above. Such method comprises:

(a) providing a substantially vertical, cylindrical settling tank, having:
  (i) an upper, substantially cylindrical portion;
  (ii) a bottom, having a downwardly-extending substantially torispherical, ellipsoidal, hemispherical or frusto-conical shaped curved interior surface extending downwardly from said upper cylindrical portion;
  (iii) a fluid inlet, in fluid communication with an interior of said first tank, to allow ingress of said solids-containing fluid into said interior of said first tank;
  (iv) a solids outlet, in fluid communication when open with said bottom of said first tank, disposed centrally of the first tank at a lowermost extremity thereof, for draining solids from said bottom of said tank;
  (v) a cleaned fluid outlet, disposed in said cylindrical upper region of the first tank and in fluid communication with said interior of said first tank in said cylindrical upper region, for removing fluids having reduced quantities of solids entrained therein from said tank; and
  (vi) a jetting fluid source, situated in a lower region of said first tank but above said solids outlet;
(b) introducing a solids-containing fluid into said tank via said fluid inlet;
(c) removing, from said cleaned fluid outlet, fluids from said tank having reduced quantities of solids entrained therein; and
(d) when draining solids from said tank via said solids outlet, supplying said jetting fluid in a plane substantially perpendicular to a longitudinal axis of said first tank and in a direction substantially tangential to a curved interior surface of said tank.

In a preferred embodiment, such method further comprises the steps of:

coupling the fluid inlet with the jetting fluid source so that each of the fluid inlet and the jetting fluid source are supplied with said solids-containing fluid; and supplying the solids-containing fluid to the jetting fluid source when the solids outlet is opened and said solids are drained from the bottom of the tank.

The method of the present invention further relates to a method of operating a plurality of settlement tanks, each having a jetting fluid to augment the speed and spinning of a fluid vortex formed in the bottom of the tank during draining of solids from each of the respective tanks.

Accordingly, in such aspect the invention comprises a method for separating solids from a solids-containing fluid, comprising:

(a) supplying a first, substantially vertical, cylindrical settling tank, having:
  (i) an upper, substantially cylindrical portion;
  (ii) a bottom, having a downwardly-extending substantially torispherical, elispoidal, hemispherical or frusto-conical shaped curved interior surface extending downwardly from said upper cylindrical portion;
  (iii) a fluid inlet, in fluid communication with an interior of said first tank, to allow ingress of said solids-containing fluid into said interior of said first tank;
  (iv) a solids outlet, in fluid communication with said bottom of said first tank, disposed centrally of the first tank in said bottom of the first tank at a lowermost extremity thereof, for draining solids from said bottom of said first tank;
  (v) a cleaned fluid outlet, disposed in said upper cylindrical portion of the first tank and in fluid communication said interior of said first tank at a location above said fluid inlet, for removing fluids from the first tank having reduced quantities of solids entrained therein; and
  (vi) a jetting fluid source, situated in a lower region of said first tank but above said solids outlet;
(b) supplying a second, substantially vertical, cylindrical settling tank, in proximity to said first tank, said second tank having:
  i) an upper, substantially cylindrical portion;
  (ii) a bottom, having a downwardly-extending substantially torispherical, elispoidal, hemispherical or frusto-conical shaped curved interior surface extending downwardly from said upper cylindrical portion;
  (iii) a fluid inlet, in fluid communication with an interior of said second tank, to allow ingress of said solids-containing fluid into said interior of said second tank;
  (iv) a solids outlet, in fluid communication with said bottom of said second tank, disposed centrally of the second tank in said bottom of the second tank at a lowermost extremity thereof, for draining solids from said bottom of said second tank;
  (v) a cleaned fluid outlet, disposed in said upper cylindrical portion of the second tank and in fluid communication said interior of said second tank at a location above said fluid inlet, for removing fluids from the second tank having reduced quantities of solids entrained therein; and
  (vi) a jetting fluid source, situated in a lower region of said second tank but above said solids outlet;
(c) coupling, in fluid communication, said clean water outlet of said first tank with said fluid inlet of said second tank;
(d) introducing a solids-containing fluid into said fluid inlet of said first tank;
(e) supplying fluid from said cleaned fluid outlet of said first tank having reduced quantities of solids entrained therein, to said fluid inlet of said second tank;
(f) when draining solids from said first tank and/or said second tank, supplying said jetting fluid respectively to said jetting fluid source in said first and/or second tank, and directing said jetting fluid in a plane substantially perpendicular to a longitudinal axis of said respective tank and in a direction substantially tangential said curved interior surface of said respective tank.

In a further refinement of the above method, such method comprises, when draining solids from said second tank in step (f) above, the further step of supplying solids-containing fluid from the fluid inlet of said first tank to the jetting fluid source on said second tank.

Such method may further be modified, wherein the fluid inlet and said jetting fluid source are one and the same, by supplying fluid from the cleaned fluid outlet of the first tank to said jetting fluid source/fluid inlet on said second tank via a conduit which extends into the bottom of said second tank and has a nozzle at its distal end, and having the further step of:

directing fluid from said nozzle in a plane substantially perpendicular to said longitudinal axis of said second tank and in a direction substantially tangential to said curved interior surface of said second tank.

The above summary of various aspects and embodiments of the invention does not necessarily describe the entire scope of the present invention. Other aspects, features and advantages of the invention will be apparent to those of ordinary skill in the art upon a proper review of the entire description of the invention as a whole, including the drawings and consideration of the specific embodiments of the invention described in the detailed description.

BRIEF DESCRIPTION OF THE DRAWINGS

The following depict preferred and non-limiting embodiments of the invention, in which.

DETAILED DESCRIPTION OF SOME OF THE PREFERRED EMBODIMENTS OF THE PRESENT INVENTION

Figure 1:
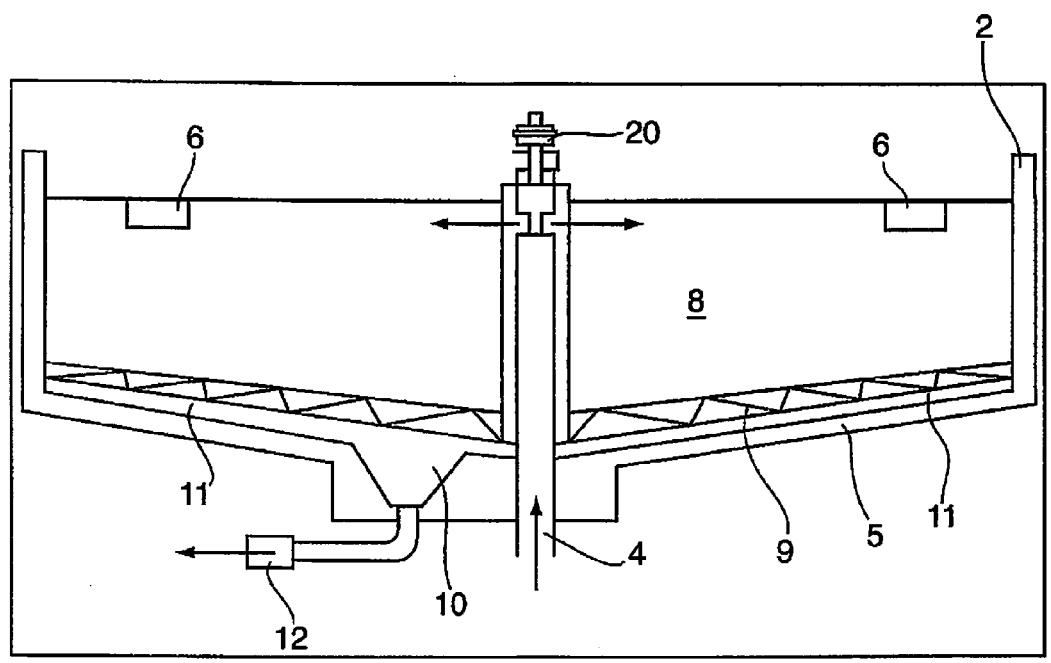
FIG. 1 is a cross-sectional view of a prior art settling tank typically used in sewage treatment systems, having a frustoconical base and further having a rotatable rake assisting in removal of settled solids from the frusto-conical downwardly-extending base thereof.

FIG. 1 depicts a generally cylindrical settlement tank 2 of the prior art, typically used in sewage treatment ponds for separating solids from sewage effluent. Tank 2 is comprised of a generally cylindrical upper portion 8, and a frusto-conical bottom portion 5. A solids-containing fluid inlet 4 is provided, to dispense solids-containing fluid in a central region of upper portion 8 of tank 2. A clean water outlet 6 is provided around an outer circumference of cylindrical upper portion 8. Solids 11 the solids-containing liquid migrate downwardly due to being heavier than the fluid in which they are entrained, and settle on frusto-conical bottom portion 5.

Radial rake arms 9, powered by motor 20, rotate and generally sweep settled solids from frusto-conical surface so as to re-introduce them into fluid proximate frusto-conical bottom portion 5, where they may, by means of sump pump 12, be drawn downwardy into conical solids outlet port 10 and thus be removed from the tank 2.

Disadvantageously, the need to provide mechanical rake arms 9 and power means 20 to continually rotate rake arms 9 and "sweep" the bottom frusto-conical surface 5 adds to the capital and operating costs of such a settlement tank 2 and system.

Figure 2:
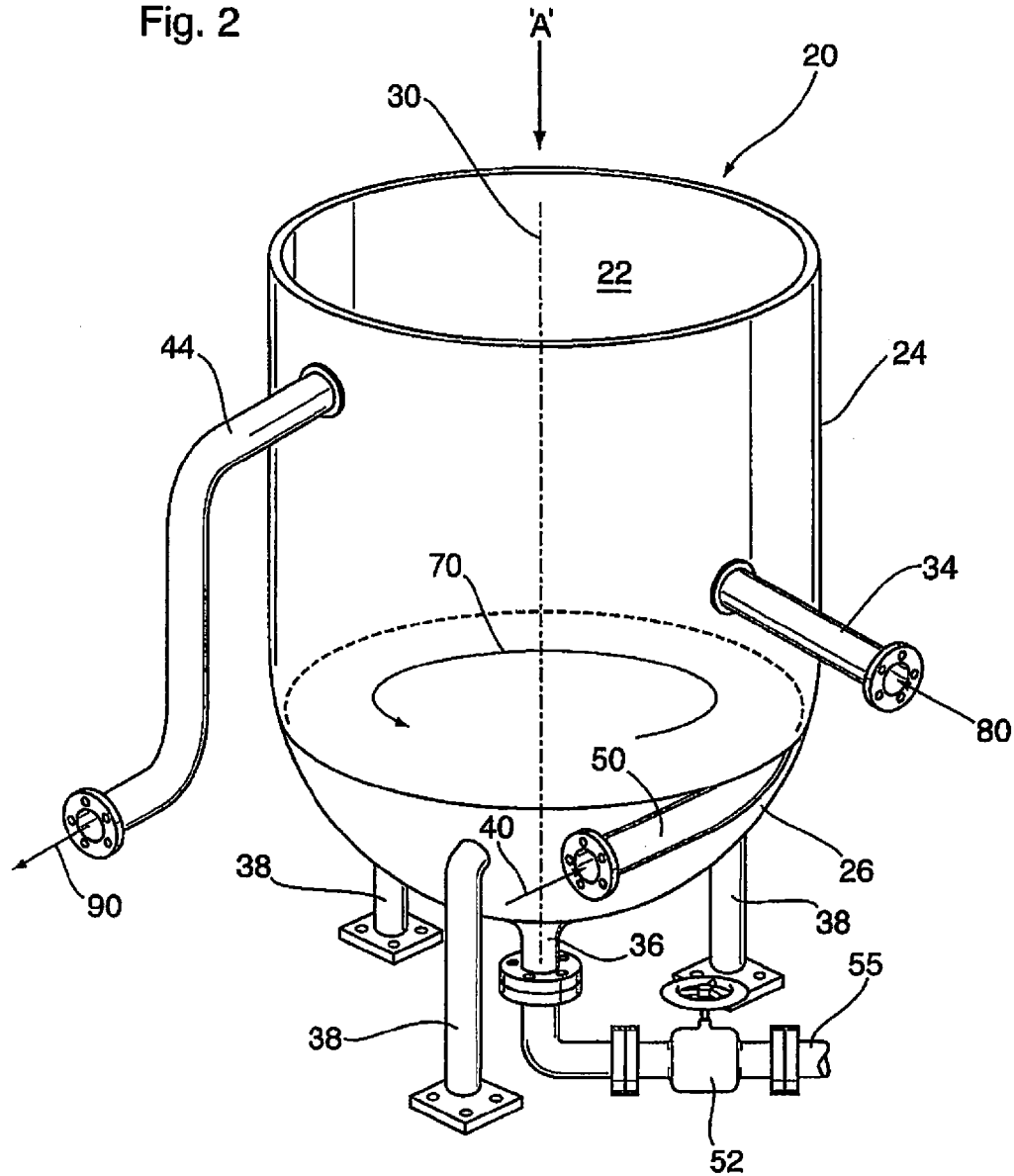
FIG. 2 is a perspective view of a settling tank of the present invention, having a substantially torispherical bottom with a centrally-located solids outlet situated therein, and further having a jetting fluid source situated in said bottom above said solids outlet, for directing a jetting fluid in a plane substantially perpendicular to a longitudinal axis of the tank and in a direction substantially tangential to a curved interior surface of the tank, to augment a vortex formed about said solids outlet when draining solids from the tank.
Figure 3:
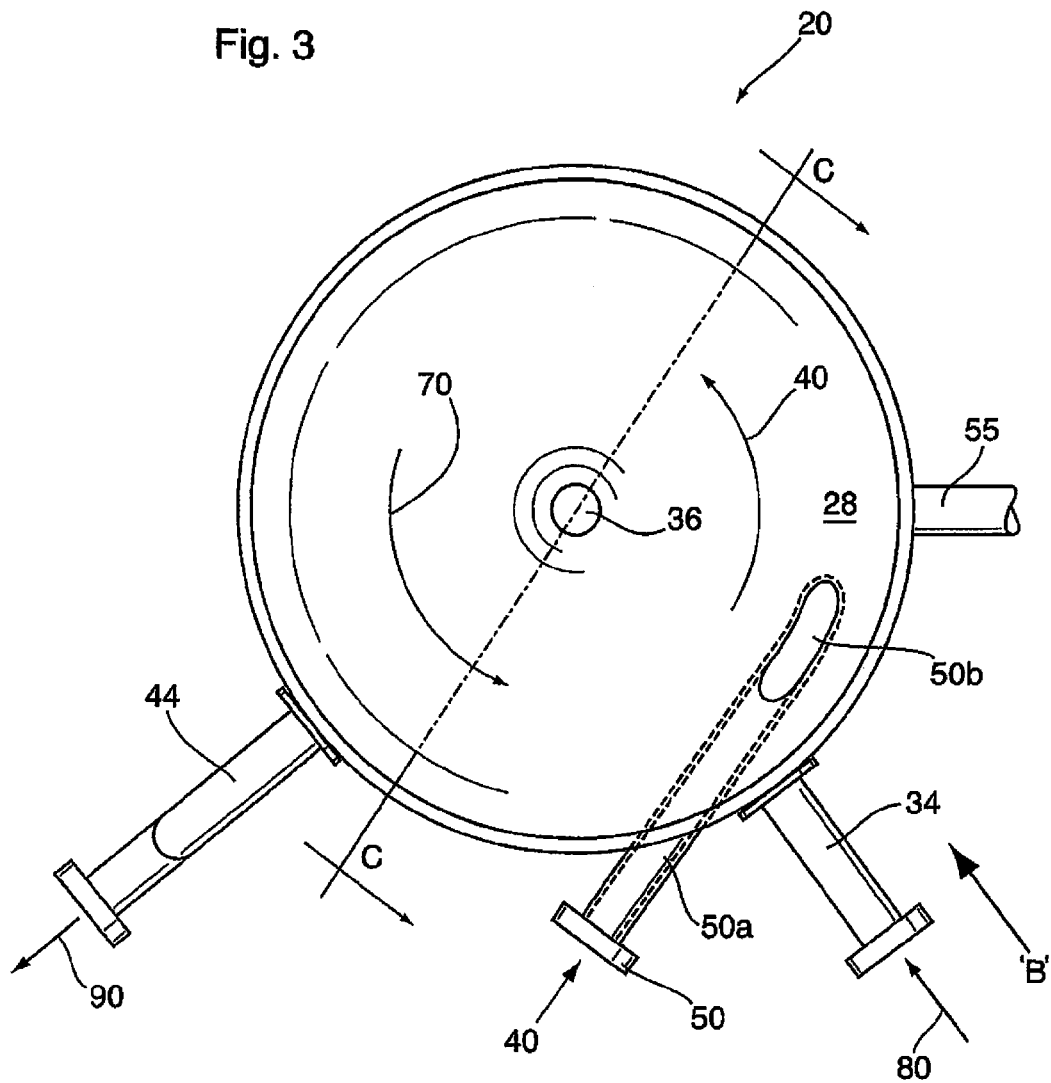
FIG. 3 is a view of the settling tank view of FIG. 2, taken in the direction of arrow "A" of FIG. 2.
Figure 4:
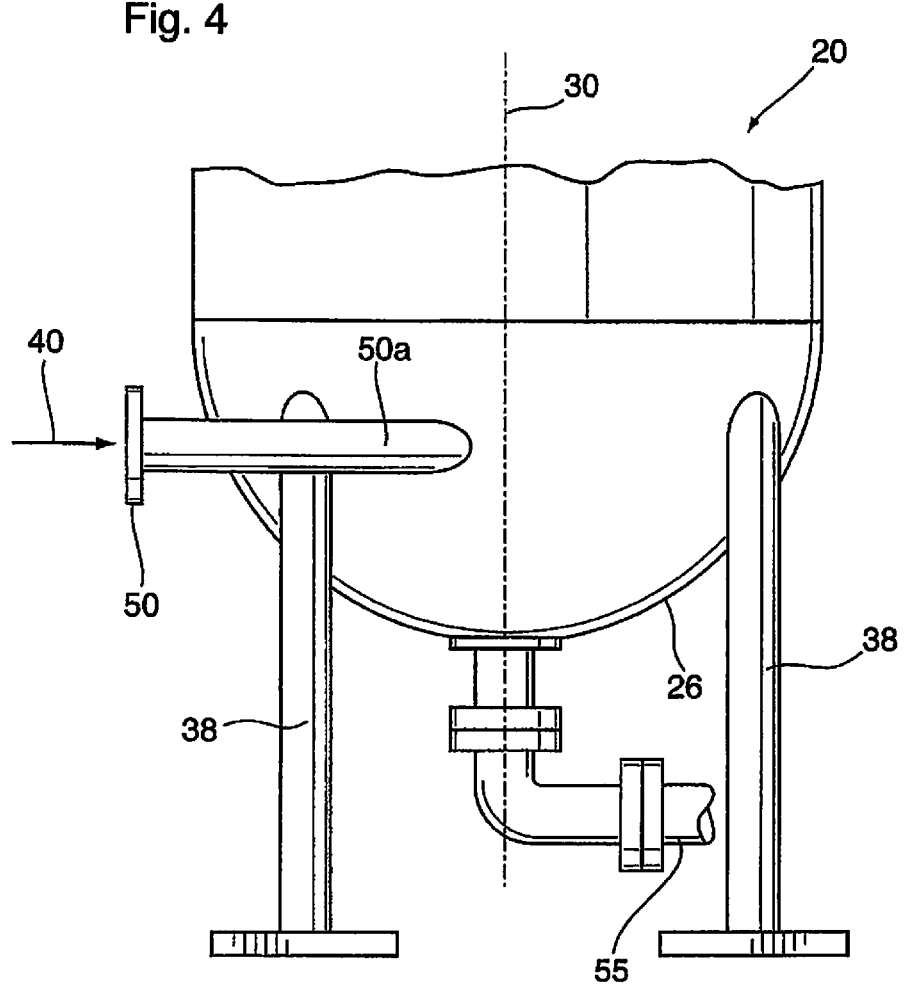
FIG. 4 is a partial view of the settling tank of FIG. 3, taken in the direction of arrow "B" of FIG. 3.

FIGS. 2-4 depict a settlement tank 20 of the present invention which allows continuous or near-continuous clarification of a solids-containing fluid stream 80 without the use of rotating mechanical rake arms, and which tank 20 as hereinafter explained has novel means for assisting in eliminating solids which continually settle and build up on the bottom 26 of the tank 20.

Tank 20 comprises a substantially cylindrical upper portion 24 coaxial about a vertical axis 30 thereof. Cylindrical upper portion 24 has a vertical cylindrical interior surface 22, and rests on, and is coupled to, a bottom 26. Bottom 26 has a generally downwardly-extending curved interior surface 28, and is typically of a torispherical, elispoidal, hemispherical, hemi-ellipsoidal or frusto-conical shape.

Figure 5A:
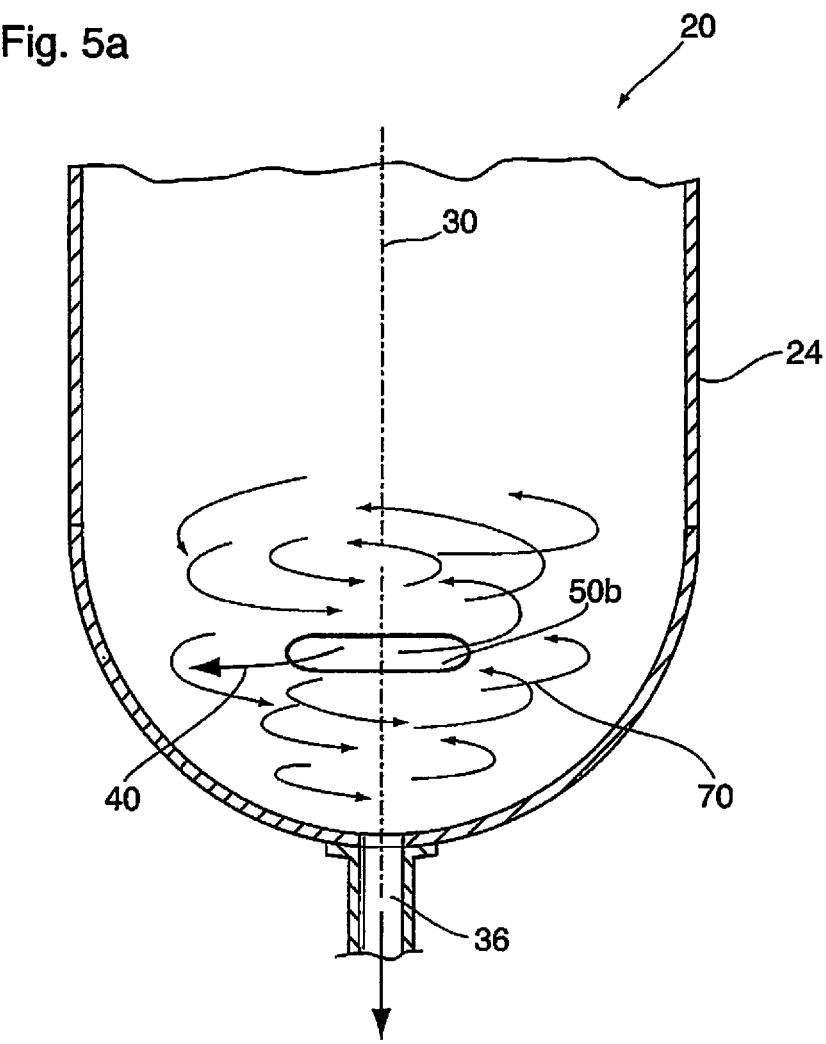
FIG. 5a is a partial cross-sectional and schematic view of the settlement tank of FIG. 2, showing the augmentation of a counter-clockwise vortex by the jetting fluid source of the present invention situated in the bottom of the settlement tank during draining of solids from the solids outlet situated in the lowermost extremity of the bottom of the tank.
Figure 5B:
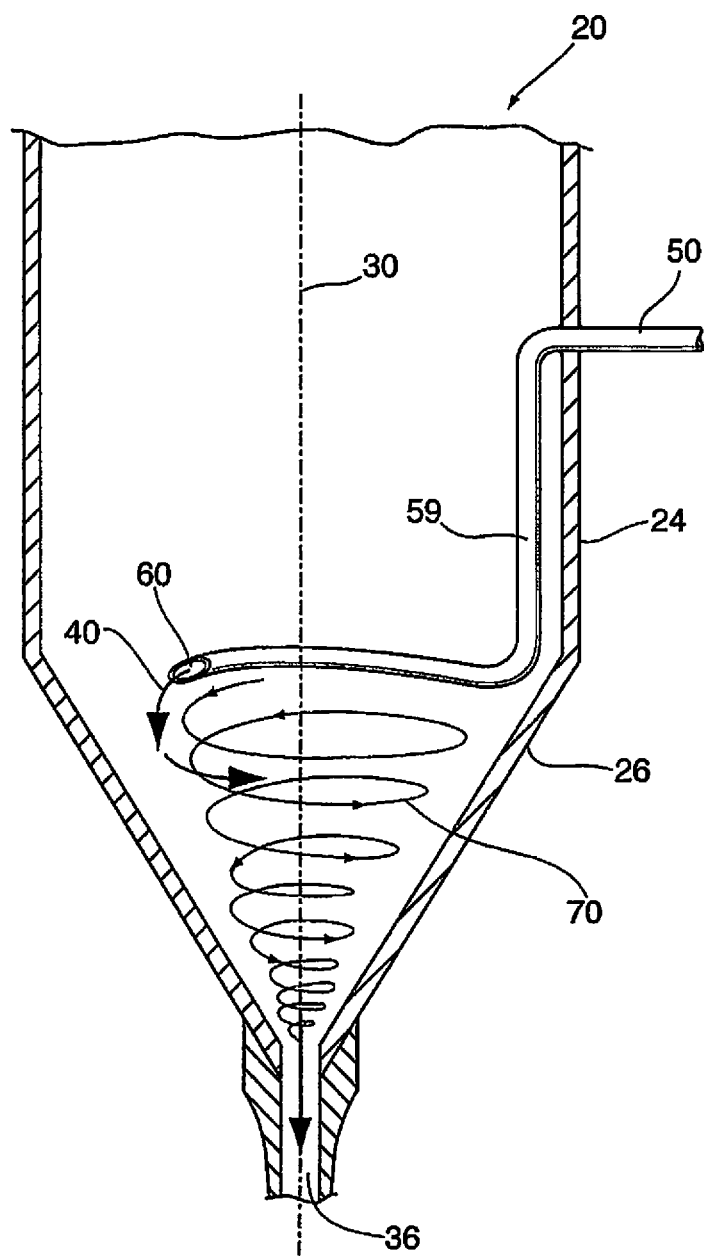
FIG. 5b is a partial cross-sectional and schematic view similar to that of FIG. 5a, wherein the settlement tank has a frusto-conical bottom, and the jetting source includes a pipe having a circumferential portion for directing a jetting fluid in a plane substantially perpendicular to a longitudinal axis of the tank and in a direction substantially tangential to a curved interior surface of the tank, to augment a vortex formed about said solids outlet when draining solids from the tank, likewise showing the augmentation of the counter-clockwise vortex by the jetting fluid source during draining of solids from the solids outlet situated in the lowermost extremity of the bottom of the tank.
Figure 6:
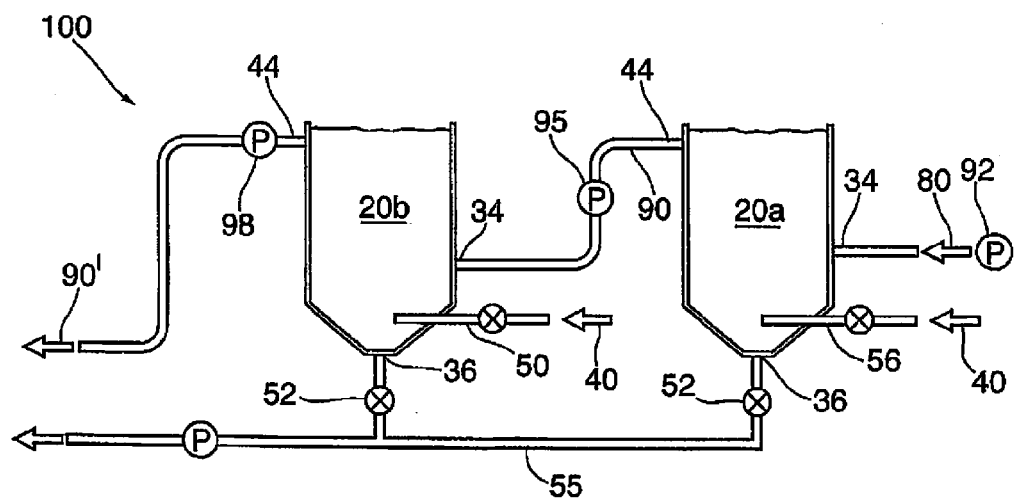
FIG. 6 is a schematic view of a settlement tank system of the method of the present invention, comprising in the embodiment shown two tanks, each having a jetting fluid source, and coupled together in series, to thereby successively clarify solids-containing fluid.
Figure 7:
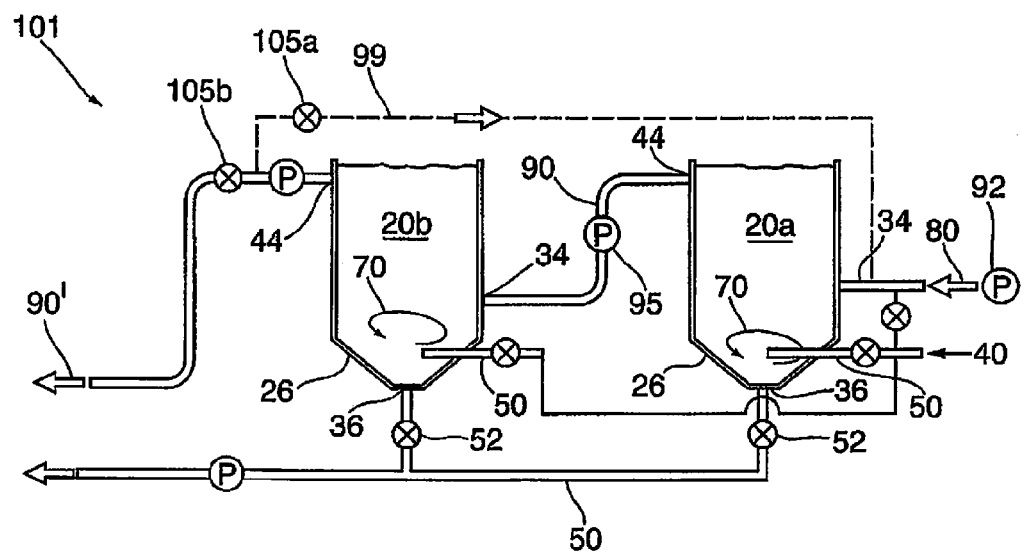
FIG. 7 is a schematic view of a settlement tank system similar to that depicted in FIG. 6, likewise employing a jetting fluid source situated in the bottom of each tank, and further having partial recirculation means to allow additional clarification of a given quantity of solids-containing fluid, using the method of the present invention.

FIGS. 2-4 depict a settling tank 20 having a bottom 26 of a torispherical shape, and FIG. 5b and FIGS. 6-7 depicting settling tanks 20 having a bottom 26 of a frusto-conical shape, said tank being—the important feature possessed by all of such bottoms 26 is that the bottom interior surface 28 of all bottom portions 26 be uniformly curved (curvilinear) and free of discontinuities so as to permit unimpeded swirling of fluid in a plane within such tank 20 substantially perpendicular to the longitudinal axis 30 of tank 20.

A plurality of tank support members 38 are fixedly coupled to an exterior surface of bottom 26, to both support bottom 26 when containing fluid and to further ensure tank 20 remains in a vertical upright position, as it will not otherwise remain in a vertical position due to the curved bottom 26. Where the tank is of rolled steel, conveniently a plurality of vertical support members 38 will typically be welded to bottom portion of tank 20 to thereby support the tank 20 in a vertical upright position as shown in FIG. 2. Other means of affixing support members 38 to support tank 20 in a vertical upright position, which means do not detrimentally affect the ability and integrity of the tank 20 to hold fluids, will also now be apparent to persons of skill in the art.

Importantly, a jetting fluid source 50 is situated in a lower region of tank 20 proximate (or in) bottom 26 so as to be in fluid communication therewith, and located above solids outlet 36. Jetting fluid source 50 is in fluid communication with exterior 22 of tank 20 so as to be provided with a jetting fluid.

In the embodiment of tank 20 and the method employed therein, jetting fluid source 50, 50a, 50b is separate and discrete from fluid inlet 34. Fluid is provided, in fluid communication with interior 22 of tank 20, for directing a solids-containing fluid 40 into tank 20 for clarification. In such embodiment, fluid inlet 34 is typically situated in a lower region of tank 20, and preferably coupled perpendicularly to the exterior surface of tank 20 as shown in FIG. 2, so as to thereby introduce solids-containing fluid 40 into tank 20 in a non-tangential manner to thereby avoid creating swirl in a direction contrary to the direction of swirl created by the jetting fluid source 50, as further described below, which would counteract the desired swirl being introduced by such jetting fluid source 50.

A solids outlet 36, disposed proximate a lowermost extremity of bottom 26 is provided, for allowing draining of solids from time to time, or continuously, from the bottom 26 of tank 20. A hand-operated or automatically-controlled valve 52 may be provided in conduit 55 leading from solids outlet 36, to control the timing and rate of solids being drained from bottom 26 of tank 20.

A cleaned fluid outlet 44 is further provided, in fluid communication with an interior 22 of tank 20 in the cylindrical upper portion 24 therof as shown in FIG. 2, for removing fluids having reduced quantities of solids entrained therein from tank 20.

The objective of jetting fluid source 50 is to introduce a jetting fluid 40 into tank 20, in a plane substantially perpendicular to longitudinal axis 30, and in a direction and at a location substantially tangential to the cylindrical interior surface 28 of bottom 26, or tangential to the cylindrical interior surface 22 of cylindrical portion 24 where the jetting fluid is supplied in close proximity to the bottom 26, so as to thereby introduce rotational swirl of fluid in bottom 26 about longitudinal axis of tank 20.

The jetting fluid 40 may be a solids-containing liquid 80 (preferably, but not necessarily, the same liquid as being treated in separation tanks 20), a gas such as air, or alternatively a dual-phase gas liquid mixture having microbubbles of gas entrained therein.

The jetting fluid source 50 may comprise, as shown in FIGS. 2 and 3, a hollow pipe 50a welded over a milled aperture 50b within curved interior 28 of tank 20, wherein aperture 50b is adapted to introduce jetting fluid into the interior 28 of tank 20 in a plane perpendicular to longitudinal axis 30 of tank 20. Pipe 50a is welded or affixed to the exterior surface of tank 20, as shown in FIG. 2, so that jetting fluid will be supplied to the interior 28 of tank 20 via aperture 50b therein in a direction tangential to the interior curved surface 28 of bottom 26, or alternatively, if aperture 50b is made in upper portion 24 of tank 20, that such aperture 50b be in the lower region thereof and in close proximity to bottom 26 in order, when jetting fluid is supplied to aperture 50b, to introduce swirl and augment the action of a vortex 70 in bottom 26 of tank 20 (ref. FIG. 5a). Preferably, in order to best augment the swirling and rotation of the vortex 70 created in a settling tank 20 of large volume situated in North America, the jetting fluid source 50 and associated aperture 50b preferably directs and is adapted to direct the jetting fluid 40 in a counter-clockwise direction within bottom 26 of tank 20 when viewed from above looking downwardly on said interior surface 28 of said bottom 26 of the tank 20, so as to best assist in creation of, or enhance the spinning of, the counter-clockwise vortex 70 of fluid in said bottom of said tank (ref. FIG. 5a).

Alternatively, as shown in FIG. 5b, jetting fluid source 50 may comprise an elongate pipe 59 within the interior 28 of tank 20, which has, at its distal end, a nozzle or aperture 60. Pipe 59 and nozzle 60 are configured within tank 20 so as to direct jetting fluid in a plane substantially perpendicular to longitudinal axis 30 and in a direction and at a location substantially tangential to said cylindrical interior surface 22 or said curved interior surface 28 of said tank 20, so as to augment the size and speed of a vortex 70 formed in bottom 26 of tank 20 when drawing solids from solids outlet 36 (ref. FIG. 5b). Again, in order to best augment the swirling and rotation of the vortex 70 created in a settling tank 20 of large volume situated in North America, the jetting fluid source 50 and associated nozzle 60 at distal end of pipe 59 preferably directs and is adapted to direct the jetting fluid 40 in a counter-clockwise direction within bottom 26 of tank 20 when viewed from above looking downwardly on said interior surface 28 of said bottom 26 of the tank 20, so as to best assist in creation of, or enhance the spinning of, the counter-clockwise vortex 70 of fluid in said bottom of said tank (ref FIG. 5b).

In operation of the above settling tank 20 of shown in FIG. 5b, a solids-containing fluid 80 is introduced into a lower region of tank 20 via fluid inlet 34 (not shown in FIG. 5*b* but shown in FIG. 2). Clarified fluids 90 are removed, from an upper region of tank 20, via cleaned fluid outlet 44. When solids outlet (ie sump or drain) 36 is opened, jetting fluid source 50 and pipe 50*a* is supplied with jetting fluid 40, and jetting fluid 40 entering interior 22 of tank 20, and preferably into curved interior 28 of bottom 26 of tank 20, in apparatus, preferably directs, via aperture 50*b* or nozzle 60, the jetting fluid 40 in a counter-clockwise direction within bottom 26 of tank 20 when viewed from above looking downwardly on said interior surface 28 of said bottom 26 of the tank 20, so as to best assist in creation of, or enhance the spinning of, the counter-clockwise vortex 70 of fluid in said bottom of said tank (ref FIG. 5*a*, 5*b*).

Where the fluid inlet 34 and the jetting fluid source 50 are separate and discrete as best shown in FIGS. 2 & 3, the fluid inlet is located on tank 20 above bottom 26, and solids-containing fluid 80 is directed into said tank 20 via said fluid inlet 34 in preferably a non-tangential manner, as shown in FIG. 2,3 so as to not introduce any rotation in the fluid in the upper region 24 of the tank 20 where it is desired that the fluid therein be substantially quiescent to promote settling and downward movement of solids therein. Likewise, for similar reasons, the cleaned fluid outlet 44, likewise located in an upper region 24 of the tank 20 as shown in FIG. 2, is disposed on tank 20 in a non-tangential manner, substantially in a plane perpendicular to longitudinal axis 30, so as to withdraw cleaned fluid 90 directly from tank 20 in a manner which would not cause rotational swirl of remaining fluid contents of the tank 20 in the upper region 24 thereof.

Figure 8:
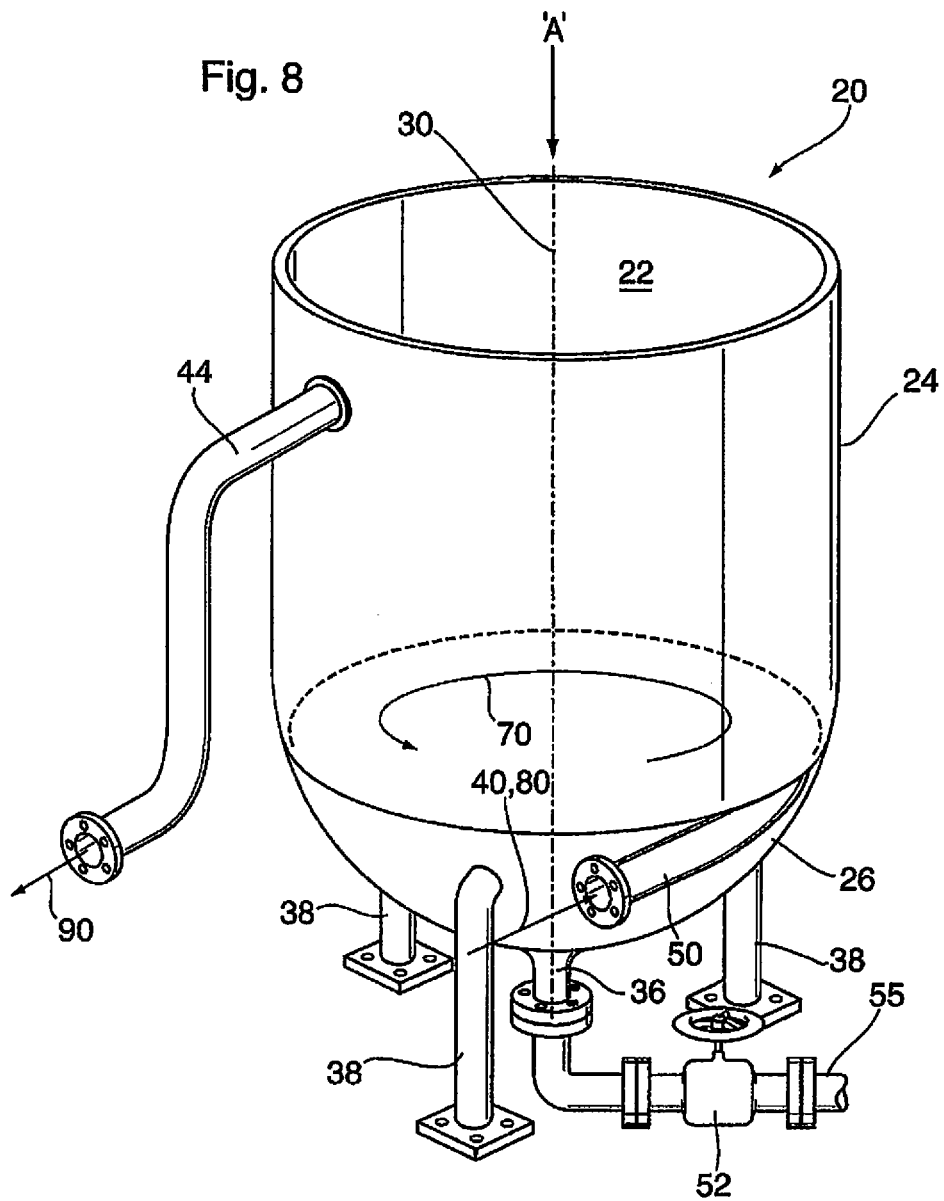
FIG. 8 shows a perspective view of a modified settling tank and system of the present invention, having a substantially torispherical bottom with a centrally-located solids outlet situated therein, wherein the fluid inlet and jetting fluid are combined in a single inlet, which is source situated preferably in the bottom of the tank above the solids outlet, and which introduces a fluid, which is serves as a jetting fluid, in a plane substantially perpendicular to a longitudinal axis of the tank and in a direction substantially tangential to a curved interior surface of the tank, to augment a vortex formed about said solids outlet when draining solids from the tank.
Figure 9:
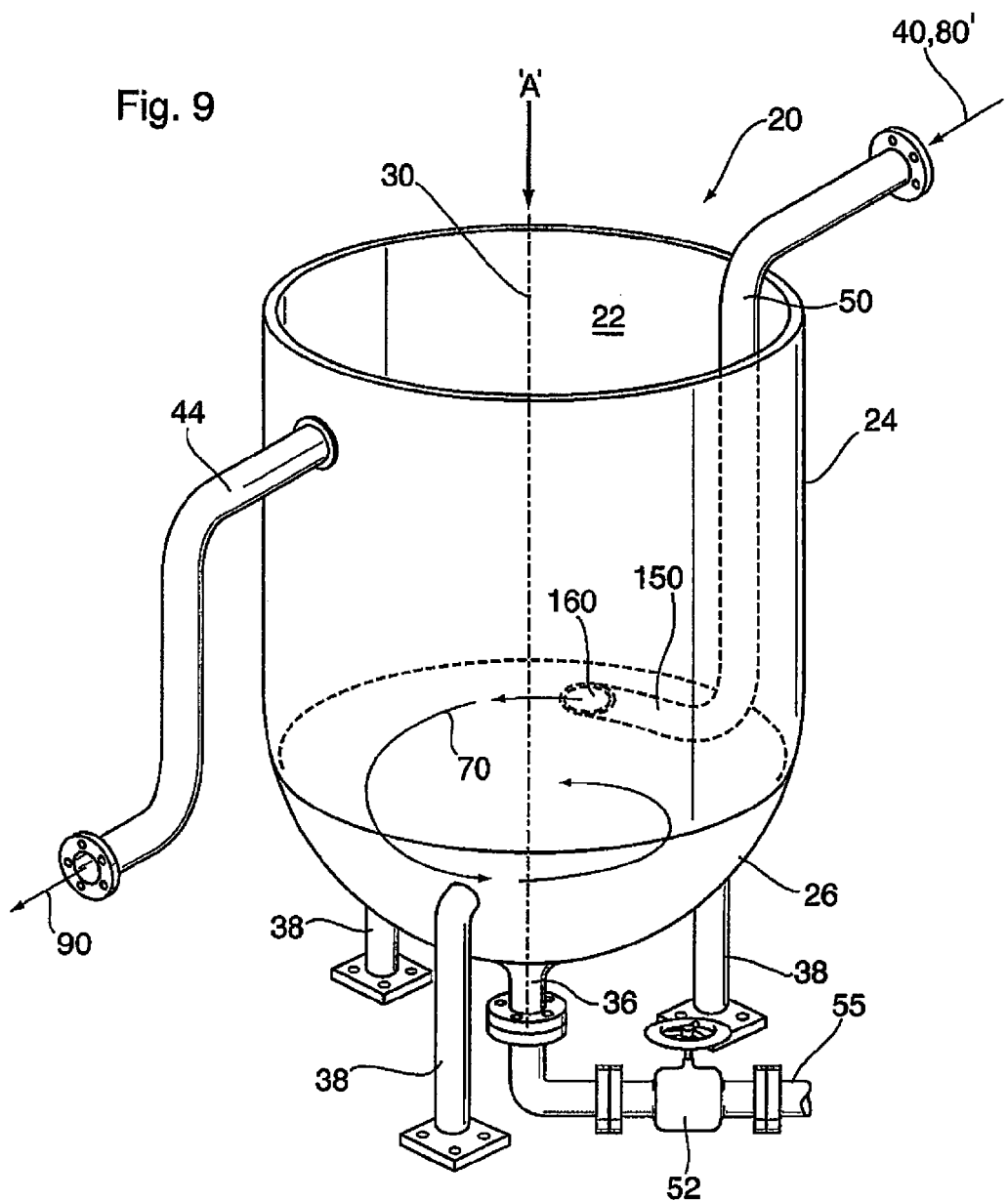
FIG. 9 shows a perspective view of a further modified settling tank and system of the present invention, having a substantially torispherical bottom with a centrally-located solids outlet situated therein, wherein the fluid inlet and jetting fluid are combined in a single jetting nozzle which extends into the lower portion of the tank and preferably into the bottom of the tank above the solids outlet, and which introduces a fluid (which inlet fluid also serves as a jetting fluid) in a plane substantially perpendicular to a longitudinal axis of the tank and in a direction substantially tangential to a curved interior surface of the tank, to augment a vortex formed about said solids outlet when draining solids from the tank.

Conversely, where the fluid inlet 34 and jetting fluid source 50 are one and the same and supplied to the tank 20 via a single conduit 50, as shown, for example, in FIGS. 8 & 9, the conduit 50 introduces fluid into tank 20 in a lower region, and preferably in bottom 26 of tank 20, and the intention is to create rotational swirl or a vortex 70 in bottom of tank 20. Again, however, in respect of cleaned fluid outlet 44 which is typically located in upper region 24 of tank 20 as shown in all Figures, is disposed on tank 20 in a non-tangential manner, substantially in a plane perpendicular to longitudinal axis 30, so as to withdraw cleaned fluid 90 directly from tank 20 in a manner which would not cause rotational swirl of remaining fluid contents of the tank 20 in the upper region 24 thereof.

FIG. 6 shows a system 100 of the present invention for clarifying solids-containing fluids, using a plurality of tanks 20*a*, 20*b* of the above design.

In the system 100 shown, tanks 20*a*, 20*b* are coupled "in series" by the cleaned fluid outlet 44 of the first tank 20 being coupled in fluid communication with the fluid inlet 34 of the second tank 20*b*, so as to permit the cleaned fluid outlet of the first tank 20*a* to supply fluids 90 having reduced quantities of solids entrained therein to the fluid inlet 34 of the second tank 20*b*, for further successive clarification of solids from such fluids 90.

In operation of the above system 100 for separating solids from solids-containing liquids 80, a solids-containing fluid 80 is pumped via pump 92 to fluids inlet 34 of first tank 20*a*. Solids outlet (i.e., drain) 36 in the bottom 26 of first tank 20*a* may be opened, and at the same time jetting fluid 40 is supplied to jetting fluid source 50 and introduced into the interior 28 of bottom of first tank 20*a* in a tangential manner as hereinbefore described, to assist in creation of a vortex 70 in bottom 26 of first tank 20*a* to assist in draining settled solids which have settled on bottom 26 of tank 20*a* from first tank 20*a* and being flowed out of first tank 20*a* via drain 36 therein. Fluids 90 having reduced quantities of solids entrained therein are removed from first tank 20*a* via fluid outlet 44 located in an upper region of first tank 20*a*, and pumped via pump 95 so as to be introduced via fluid inlet 34 into a lower region of second tank 20*b*. Drain 36 in the bottom 26 of second tank 20*b* may be opened, and at the same time jetting fluid 40 is supplied to jetting fluid source 50 in second tank 20*b* and introduced into the interior 28 of bottom 26 of second tank 20*b* in a tangential manner as hereinbefore described, to likewise assist in creation of a vortex 70 in bottom 26 of second tank 20*b* to assist in draining settled solids which have settled on bottom 26 of second tank 20*b* from second tank 20*b* and being flowed out of second tank 20*b* via drain 36 therein. Resulting clarified fluids 90' having reduced quantities of solids entrained therein are withdrawn via pump 98 from second tank 20*b* via fluid outlet 44 located in an upper region of second tank 20*b*.

FIG. 7 shows a modified system 101 of the present invention for clarifying solids-containing fluids, incorporating a number of modifications over the basic system 100 depicted in FIG. 6, likewise using a plurality of tanks 20*a*, 20*b* of the above design.

Specifically, in one variation over the system 100 shown in FIG. 6, FIG. 7 depicts a modified system 101 wherein a recycle line 99 is provided, controlled by valves 105*a*, 105*b*, to allow, if desired, partial or complete recirculation of clarified fluids 90 from fluids outlet 44 of second tank 20*b* or subsequent downstream tanks 20*c*, 20*d* (not shown) back to fluids inlet 80, thereby again clarify and further remove solids from fluid 90'.

In another variation over the system 100 depicted in FIG. 6, and as shown in FIG. 7, the jetting fluid source 50 for second tank 20*b* is in fluid communication with and the jetting fluid 50 supplied to the second tank 20*b* comes from, the solids-containing fluid 80 supplied to the fluid inlet 34 of the first tank 20*a*. Thus the solids-containing fluid 80 supplied to jetting fluid source conduit 50 provides in whole or in part the jetting action and augmentation of vortex 70 in bottom of each of tanks 20*a*, 20*b*. Alternatively, or in addition, the jetting fluid 40 supplied to the first tank 20*a* likewise comprises or includes solids-containing fluid 80 which is supplied to the fluid inlet 34 on tank 20*a*. Pump 92 may be used to provide solids-containing fluid 80 to system 101, and pump 95 may be necessary to transfer fluid 90 from cleaned fluid outlet 44 in tank 20 to fluids inlet 34 in tank 20*b*. Valves 52 situated proximate solids outlets 36 may be employed to control the timing and amount of solids removed from respective solids outlets 36 in each of tanks 20*a*, 20*b*.

FIG. 8 shows a settling tank, system, and method 20 similar to that shown in FIG. 2 wherein in such embodiment the fluid inlet 80 and jetting fluid source 40 are combined in a single conduit 50, having a inlet fluid/jetting fluid inlet aperture 50*b* within the bottom of the tank (see FIG. 3) for providing said inlet fluid/jetting fluid to the interior and lower region of tank 20 to create or augment a vortex 70 within the bottom 26 of tank 20. Again, a cleaned fluids outlet 44 is provided in an upper region of tank 20, to allow removal of clarified fluid 90.

Preferentially, for settling tanks 20 located in the northern hemisphere, for example Canada, aperture 50*b* in tank 20 is adapted, when supplied with jetting fluid 80 and/or solids-containing fluid 40 to augment and assist in the creation of a counter-clockwise vortex 70 in bottom of tank 20, so allow and assist such vortex 70 in entraining and "sweeping" solids which have settled on the curved interior of bottom 20 into suspension and thereby allowing evacuation of such solids from tank 20 when solids outlet 36 is opened.

FIG. 9 shows a further alternative embodiment of the settling tank, system and method 20 of the present invention. In such embodiment the fluid inlet 80 and jetting fluid source 40 are again combined in a single conduit 50, and instead of there being an aperture 50b within a lower region of tank 20 (see FIG. 3), conduit 50 extends downwardly to a location proximate or within bottom 26 of tank 20. Conduit 50 is preferably provided with a nozzle 160 at a distal end 150 of conduit 50 which thereby forms the jetting fluid source, to thereby provide the jetting stream in a plane perpendicular to the longitudinal axis 30 of tank 20, and in a direction substantially tangential to curved interior surface of bottom 26 of tank 20, as shown in FIG. 9, to thereby assist in the creation of, and augmentation of the size and rotational speed of a vortex 70 formed in bottom 26 of tank 20 when solids outlet port 36 is opened via valve 52, to better provide for draining of settled solids from tank 20 via conduit 55.

Figure 10:
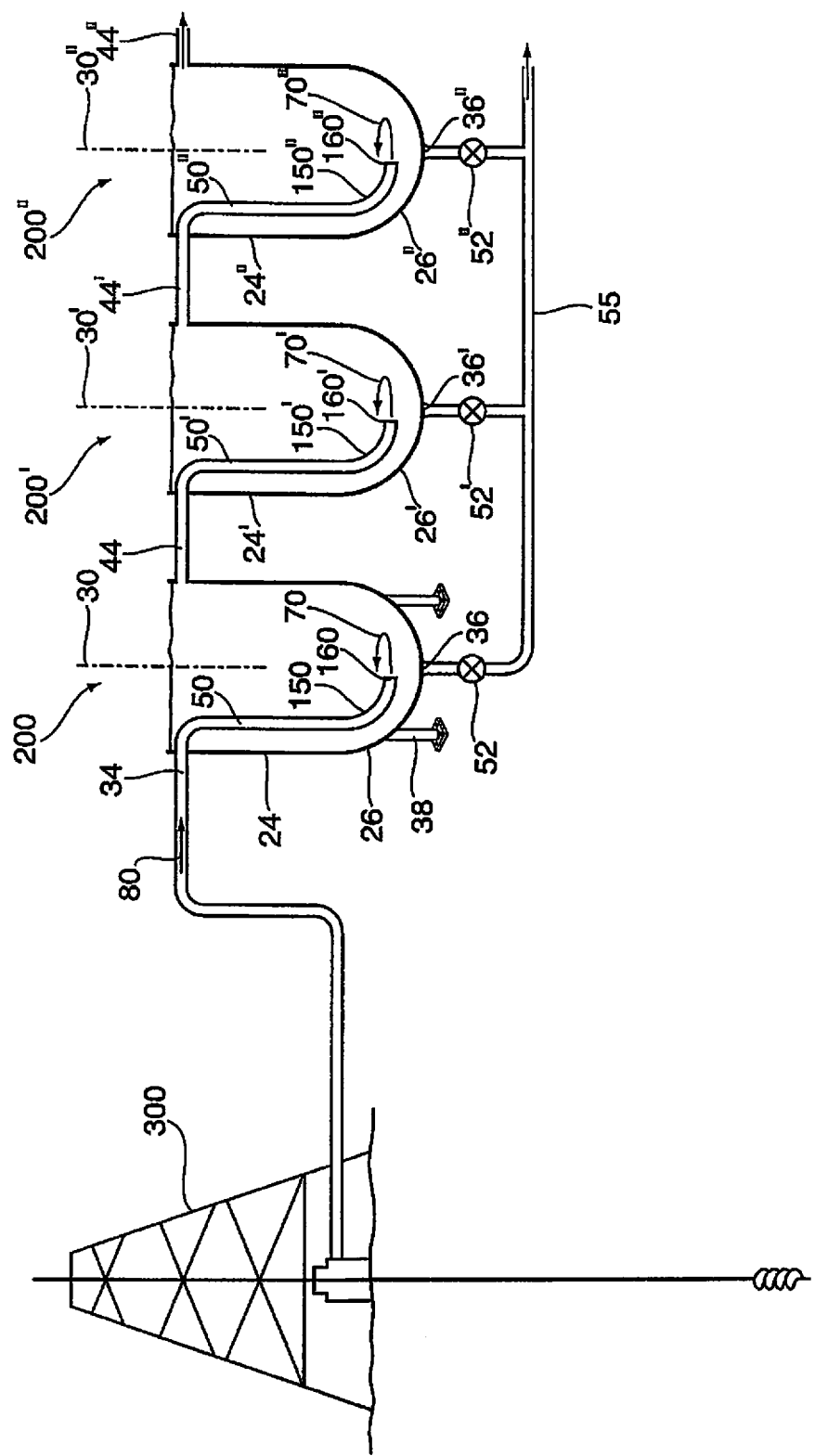
FIG. 10 is a schematic view of a series of settling tanks shown in FIG. 9, coupled in series, to successively clarify a fluid, wherein each tank is provided with a jetting nozzle which extends into the lower portion of the tank and preferably into the bottom of the tank above the solids outlet, and which introduces a fluid (which inlet fluid also serves as a jetting fluid) in a plane substantially perpendicular to a longitudinal axis of the tank and in a direction substantially tangential to a curved interior surface of the tank, to augment a vortex formed about said solids outlet when draining solids from the tank.

FIG. 10 shows a system of settling tanks 200, 200', and 200", each tank 200, 200', 200" having the configuration shown in FIG. 9, namely where the fluids inlet and the jetting fluid source are a combined fluid inlet/jetting fluid source 50, 50", 50", which system allows for successively clarifying a solids-containing fluid 80 such as drilling fluid laden with drill cuttings (not shown) emanating from a drilling rig 300.

Fluid inlet/jetting fluid source in form of conduit 50 extends downwardly in tank 200, preferably into bottom 26', where it is adapted to provide a jetting stream in a plane substantially perpendicular to longitudinal axis 30 of tank 200 and in a direction substantially tangential to a curved interior surface of bottom 26 of tank 200, to assist in augmentation of vortex 70. Nozzle 160, at distal end 150 of conduit 50, is used to provide the jetting stream in the aforementioned manner.

Cleaned fluid outlet 44 of tank 200 is in fluid communication with and coupled to combined fluid inlet/jetting fluid source conduit 50' of tank 200', which conduit 50' extends downwardly in tank 200', preferably into bottom 26', where it is likewise adapted to provide a jetting stream in a plane substantially perpendicular to longitudinal axis 30 of tank 200 and in a direction substantially tangential to a curved interior surface of bottom 26' of tank 200', to assist in augmenting the size and speed of vortex 70' within tank 200' when solids outlet port 36' is opened. Nozzle 160', at distal end 150' of conduit 50', is used to provide the jetting stream within tank 200" having the above characteristics and fulfilling the above functions, in particular augmenting vortex 70'.

Similarly, the cleaned fluid outlet 44' of tank 200' is in fluid communication with and coupled to combined fluid inlet/jetting fluid source conduit 50", which conduit 50" extends downwardly in tank 200", preferably into bottom 26", where it is adapted to provide a jetting stream in a plane substantially perpendicular to longitudinal axis 30" of tank 200" and in a direction substantially tangential to a curved interior surface of bottom 26" of tank 200", to assist in augmentation of vortex 70. Nozzle 160", at distal end 150" of conduit 50", is used to provide the jetting stream within tank 200" with the above characteristics and fulfilling the above functions, in particular augmenting vortex 70".

Use of examples in the specification, including examples of terms, is for illustrative purposes only and is not intended to limit the scope and meaning of the embodiments of the invention set out and described in the disclosure. In the specification, the word "comprising" is used as an open-ended term, substantially equivalent to the phrase "including, but not limited to," and the word "comprises" has a corresponding meaning.

To gain a better understanding of the invention described herein, the following examples are set forth. It will be understood that these examples are intended to describe illustrative embodiments of the invention and are not intended to limit the scope of the invention in any way.

EXAMPLES

Exemplary settling systems according to the present disclosure utilize circular compartments with a center drain. There are six (6) cylindrical compartments each one being six (6) feet in diameter with a straight wall vertical section of four (4) feet and finished with a torispherical bottom. There is no internal plumbing or suction lines to create traps for settled solids. The center drain creates a natural vortex affect when the drain valve is opened. To enhance and magnify the effect of the vortex a stream of fluid is introduced near the bottom of the cylindrical section. The addition of this stream of fluid in a similar direction as the natural vortex, amplifies the effect of the vortex, sweeping any settled solids from the bottom of the compartment and out the center drain.

The cylindrical compartments of the exemplary system are connected by a series of overflow troughs that allow the process fluid to traverse the series of cylindrical compartments in a sinusoidal path. Each compartment has a center six (6) inch diameter drain located at the lowest point in the torispherical bottom. A series of three (3) cylindrical compartments are connected to a common six (6) inch drain or suction pipe that exits at the back side of the skid.

Each cylindrical compartment has a torispherical bottom that slopes to the center drain. The jetting stream is introduced via a 2" conduit that can be rotated from left to right positions to produce the swirling effect required to enhance the natural vortex. In this fashion, sufficient velocity is maintained in the torispherical bottom to successfully remove the settling solids but the vertical cylindrical fluid volumes remain at sufficiently low velocity to provide an environment conducive for solids settling.

In the following Examples, a jetting fluid stream was combined with a cylindrical compartment similar in dimension to the compartments of the exemplary system to demonstrate the ability of such a combination to enhance and magnify the effect of the vortex created at the torispherical bottom of the cylindrical compartment.

Example 1

Natural Vortex

The natural vortex created in a cylindrical compartment of the exemplary system was observed for comparison with systems comprising a jetting fluid stream of the present invention.

Method and Materials—Cylindrical Compartment

Figure 11:
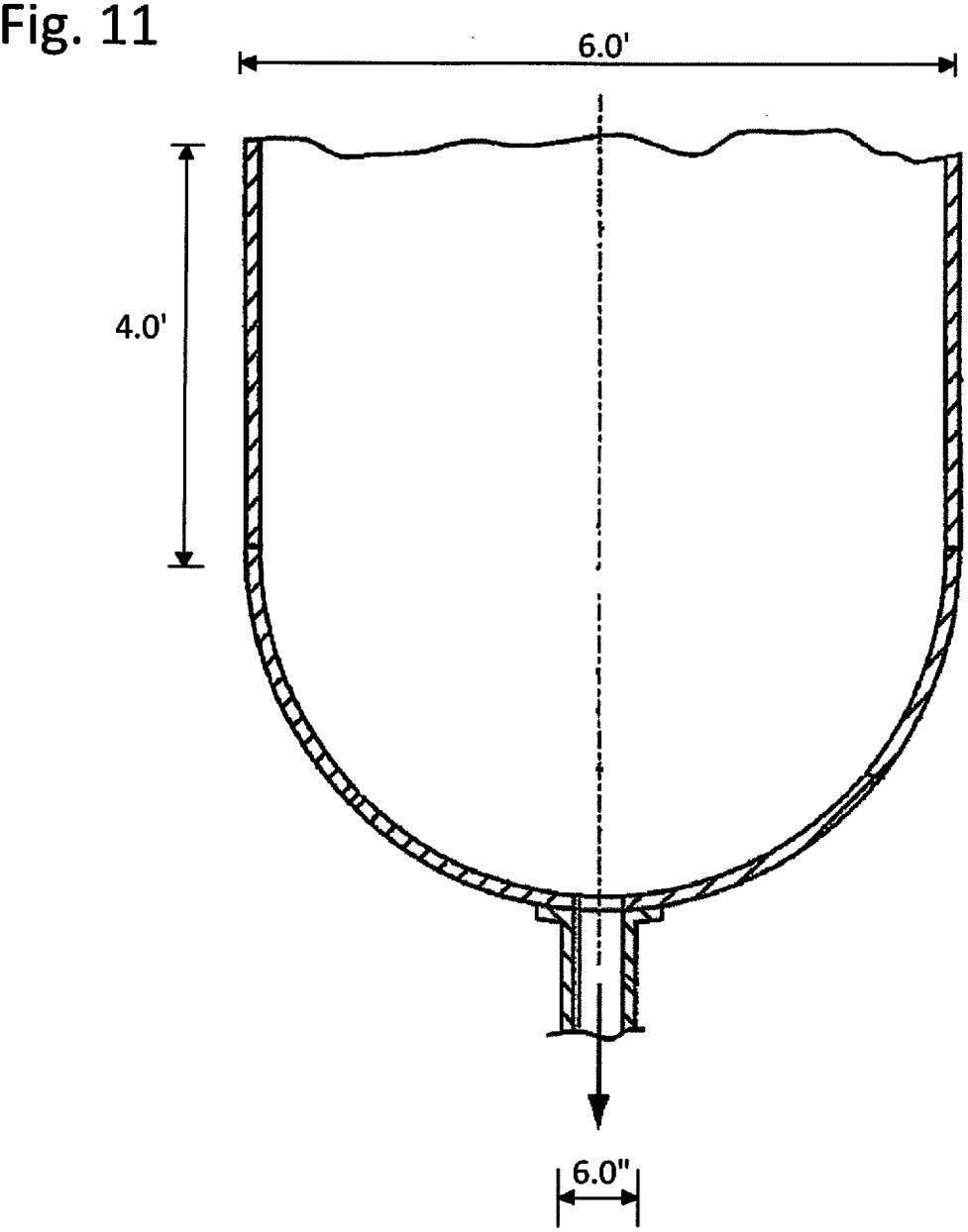
FIG. 11 is a partial cross-sectional and schematic view of the cylindrical compartment (settlement tank) of the exemplary settling system described in Example 1, wherein the natural vortex was observed.

The cylindrical compartment having a six (6) foot diameter cylinder shape and torispherical bottom was used. A six (6) inch diameter drain was located in the center of the cylindrical compartment with a manually actuated compression valve to shut off flow to the drain (FIG. 11).

The cylindrical compartment was completely filled with fluid, in this case water, as it would be in actual field operations to a depth of 4 ft above that portion of the cylindrical vessel that transitions to a torisherical bottom.

The compartment was allowed to stand idle for twelve (12) hours prior to the test to allow earth gravitational forces to stabilize.

There were significant amounts of settled solids collected on the bottom of the compartment. The center drain was then manually opened to release the fluid. In this test example, the fluids were simply gravity drained from the tank without the use of any pumping equipment to accelerate the removal of the fluids. No external jetting stream was added in this test case.

Results

In this example, fluid was gravity drained from the compartment. As the testing was conducted in Calgary, Alberta, in the northern hemisphere, a natural counterclockwise vortex was evidenced in the escaping fluids as the fluid level in the compartment was reduced below the top of the torispherical section. The effect of the natural vortex, namely the increased fluid velocity of the fluid in the induced vortex was not substantial enough to cause settled solids collected on the bottom of the compartment to be "swept up" and thereby mobilized with the fluid escaping.

Conclusions

While the natural vortex was created and evident, the effect of the natural vortex was not substantial enough to cause settled solids collected on the bottom of the compartment to mobilize with the fluid escaping.

Example 2

Top-Located Vertical Jetting Stream

A second test was conducted utilizing a cylindrical compartment in combination with a jetting fluid stream of approximately ½" diameter via a ½ inch diameter garden hose, introduced in a direction parallel to the longitudinal axis of the cylindrical portion of the compartment above the top fluid level of the contained fluid, at an velocity of approximately 130 ft./min. (i.e. 20 l/min×0.0353147 cu.ft/ l/($\Pi \times (0.5/12)^2$)=130 ft/min). The effect of the jetting fluid stream on the natural vortex observed in Example 1 was determined.

Method and Materials—Cylindrical Compartment

A second cylindrical compartment identical to the compartment used in Example 1 was used. As in Example 1, the cylindrical compartment had a six (6) foot cylinder shape and torispherical bottom. A six (6) inch diameter drain was located in the center of the cylindrical compartment with a manually actuated compression valve to shut off flow to the drain.

Figure 12:
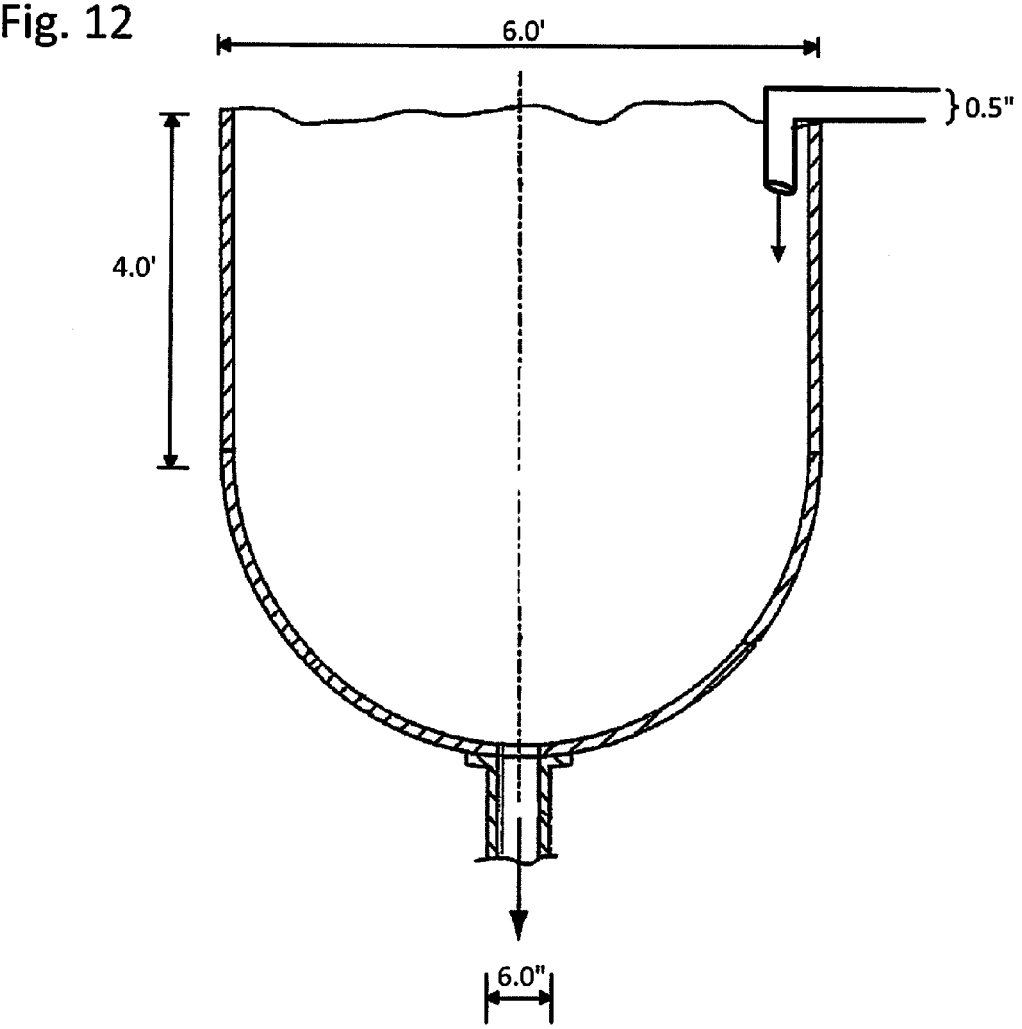
FIG. 12 is a partial cross-sectional and schematic view of the cylindrical compartment (settlement tank) of the exemplary settling system described in Example 2 showing a jetting fluid stream introduced vertically to the tank above the top fluid level of the contained fluid in the compartment.

As in Example 1, the compartment was completely filled with water and allowed to stabilize for 12 hours prior to testing. Significant amounts of sediment were again observed to collect on the bottom of the compartment. The center drain was once again opened to allow the fluid to gravity drain out of the compartment and the jetting fluid stream introduced vertically to the tank above the top fluid level of the contained fluid in the compartment (FIG. 12). The jetting stream was created by a forty (40) psi, twenty (20) liter per minute (~130 ft/min velocity) fluid stream introduced in the vertical cylindrical portion of the chamber by means of a half inch garden hose. The jetting stream was added adjacent to the external wall of the cylindrical compartment furthest from the center drain, and in a vertically downward direction. This would be considered the least desirable direction to add the jetting stream to the compartment due to the vertical integration of the jetting fluid which would cause turbulence in the settling compartment.

Results

It was evident from the test, that solids are indeed mobilized from the bottom of the compartment with the addition of the twenty (20) liter per minute jetting stream to the compartment. It was also observed that the effect of the vortex was much more pronounced than the natural vortex observed in Example 1, however, the occurrence of vertical inter-mixing of fluid and turbulence created in the upper cylindrical section is undesirable for settling efficiency. This observation supports the expectation that a stronger enhanced vortex will remove collected settled solids from the bottom of the settling chamber.

Conclusions

It was further determined that the use of a half inch garden hose to introduce a twenty (20) liters per minute jetting stream would create the least amount of agitation in the torispherical bottom of the compartment. It is concluded that if solids movement could be accomplished with minimal enhancement to the natural vortex, as demonstrated herein, a significantly stronger jetting fluid force would be expected to create a much larger and stronger vortex affect.

Example 3

Bottom-Located Horizontal Jetting Stream

The effect of a jetting stream introduced in essentially the same direction as the naturally occurring vortex was tested and compared to the observations made in Examples 1 and 2.

Method and Materials—Cylindrical Compartment

A third cylindrical compartment identical to the preceding Examples was used. Significant settled solids were again evident on the bottom of the settling compartment after the 12 hour stabilization period. The fluid was then allowed to gravity drain via the center drain outlet in a similar fashion as in the previous two tests.

Figure 13:
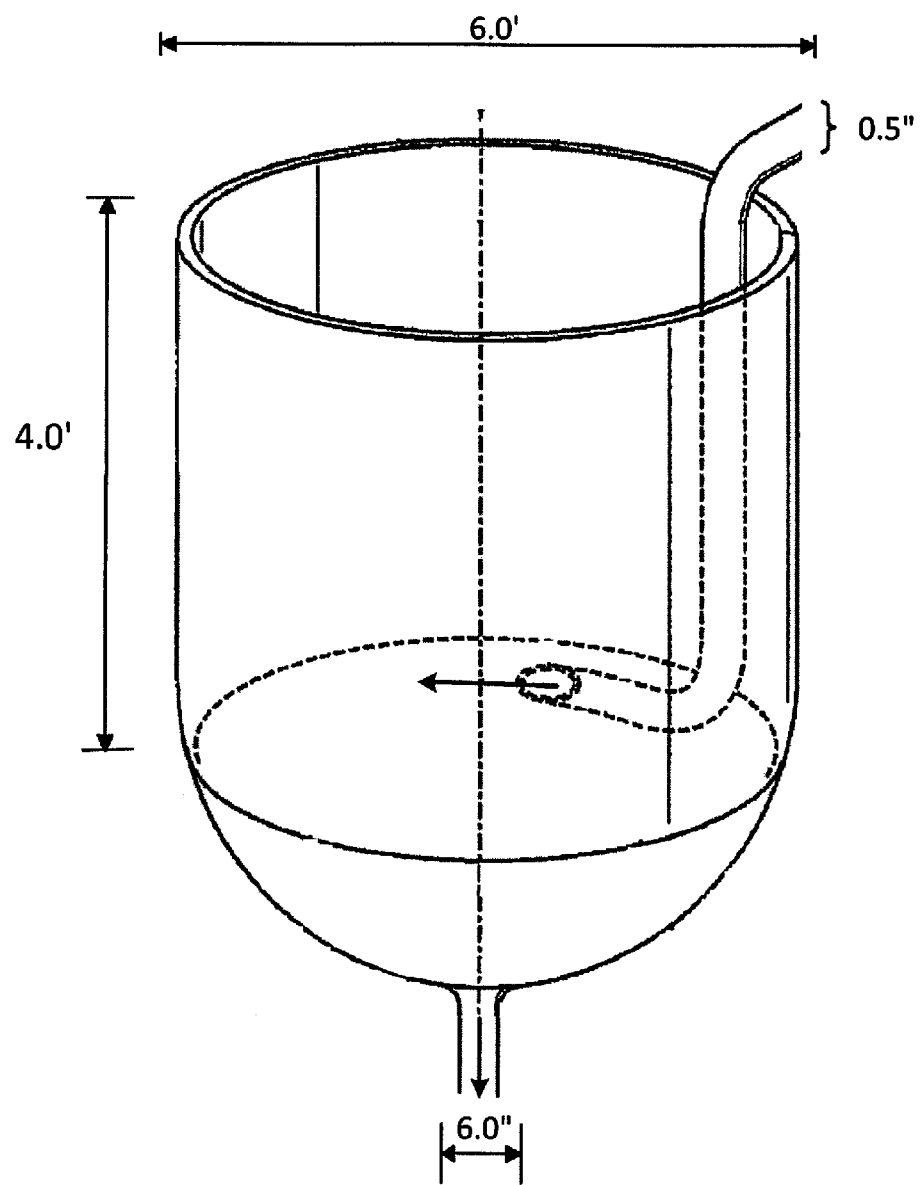
FIG. 13 is a partial cross-sectional and schematic view of the cylindrical compartment (settlement tank) of the exemplary settling system described in Example 3 showing a jetting fluid stream introduced in a horizontal plane in the same direction as the naturally occurring vortex.

For this third test, the forty (40) psi, twenty (20) liter per minute (130 ft/min) jetting stream was introduced in the lower portion of the chamber, well below the top of the torispherical section, essentially at the bottom of the torispherical bottom but located adjacent to the outer tank wall furthest from the center drain (FIG. 13). By introducing the jetting stream along the bottom of the torispherical bottom, it was expected that larger settled solids would be mobilized and drawn to the exit drain of the compartment.

Results

By introducing the jetting stream in essentially the same direction as the naturally occurring vortex, a greater evidence of swirling of the draining fluids was observed much sooner in the test. The vortex was significantly larger and much more pronounced with the introduction of the jetting fluid in a horizontal plane in the same direction as the naturally occurring vortex. This is evidenced in the swirling of the fluids well up into the settling chamber section of the compartment, however the swirling motion was gentle enough so as not to inhibit settling efficiency in the upper section of the chamber.

Conclusions

Introduction of the jetting fluid in a horizontal plane in the same direction as the naturally-occurring vortex created a significantly larger and much more pronounced vortex that magnified the swept area of the bottom of the compartment to increase the amount of solids mobilized. The introduction of a jetting source of fluid encourages an enhanced vortex with greater capability to mobilize settled solids from the bottom of the chamber.

Summary

It was evident that with no internal plumbing present in the settling compartments that there would be no impediment for solids to settle and remain on the bottom of the compartment.

It was further evidenced that simply opening a center drain caused a natural vortex to form as the fluids were drained from the compartment. The natural vortex was quite weak and did not form until nearly all of the fluids were drained from the tank. It was clear that the natural vortex by itself would not be sufficient to mobilize cuttings of solids that had already collected on the bottom of the compartments.

The addition of a forty (40) psi, twenty (20) liter per minute (130 ft./min) vertical jetting stream into the cylindrical vertical portion of the settling chamber produced an increased or enhanced vortex effect. The introduction of the jetting stream in the vertical settling portion of the chamber is, however, less desirable as it creates turbulence in the settling chamber which would inhibit the settling action in the vessel.

The addition of the forty (40) psi, twenty (20) liter per minute (130 ft./min) jetting stream in the bottom of the torispherical section in a direction similar to the natural vortex created a stronger vortex with sufficient velocity to mobilize settled solids from the bottom of the settling compartment. Introducing the jetting stream in the same direction that the natural vortex occurs, produced a much stronger enhanced vortex effect and swirling was evident near the top of the fluid in the torispherical section. The "natural vortex" effect, therefore, can be enhanced with the introduction of a jetting stream in the torispherical bottom sufficiently enough to prevent the collection of solids on the bottom of the settling chamber.

It can be concluded that the introduction of essentially a much higher velocity jetting fluid into the torispherical bottom of the chamber will produce the desired effect of a pronounced "Enhanced Vortex". A substantially "Enhanced Vortex" will ensure no solids collect on the bottom of the settling chamber thus preserving the full volumetric efficiency of the vessel and eliminating the need for additional cleaning fluids and the creation of additional waste.

While gravity drainage was relied on in these tests, it is expected that the natural vortex would be significantly enhanced if a pump was utilized to withdraw the fluids as it would create significantly more velocity at the fluid exit point. The use of a pump to withdraw the fluids would also create a constant and consistent vortex effect the entire time the drain is open and the pump is engaged by maintaining a constant velocity in the removed fluids.

The scope of the claims should not be limited by the preferred embodiments set forth in the foregoing examples, but should be given the broadest interpretation consistent with the description as a whole, and the claims are not to be limited to the preferred or exemplified embodiments of the invention.

The embodiments in which an exclusive property and privilege is claimed are set out in the following claims:

1. A settling tank apparatus for separating solids from a solids-containing fluid, comprising:
    (a) a substantially cylindrical settling tank having a substantially vertical, central axis, further having:
        (i) a substantially cylindrical upper portion coaxial with said vertical axis and having a cylindrical interior surface;
        (ii) a hemispherical bottom, located below said cylindrical upper portion, having a downwardly-extending concave inwardly-curved interior surface symmetric about said vertical axis and substantially free of obstructions which would otherwise obstruct or disrupt rotation of fluid within said hemispherical bottom about said vertical axis in a plane perpendicular to said vertical axis;
        (iii) a solids outlet, disposed at a lowermost extremity of said hemispherical bottom and centrally within said hemispherical bottom and substantially co-axial with said vertical axis, for draining of solids from said hemispherical bottom of said settling tank;
        (iv) a cleaned fluid outlet, disposed in said cylindrical upper portion of said substantially cylindrical settling tank in fluid communication with an interior of said settling tank, for removing fluids having reduced quantities of solids entrained therein from said tank; and
    (b) a jetting fluid source, situated in a upper region of said hemispherical bottom and above said solids outlet in said hemispherical bottom, for directing a jetting fluid into said hemispherical bottom in a plane substantially perpendicular to said vertical axis and in a direction substantially tangential to said downwardly-extending concave inwardly-curved interior surface of said hemispherical bottom, to permit introduction or augmentation of rotational swirl of fluid in said hemispherical bottom in said plane and about said vertical axis when draining solids from said solids outlet in said hemispherical bottom.

2. The settling tank apparatus as claimed in claim 1, further having a fluid inlet, in fluid communication with an interior of said settling tank, for directing said solids-containing fluid into said tank wherein said jetting fluid source and said fluid inlet are one and the same, and said inlet fluid/jetting fluid is supplied to said settling tank, in a plane substantially perpendicular to said vertical axis and in a direction substantially tangential to said inwardly-curved interior surface.

3. The settling tank apparatus as claimed in claim 1, further having a fluid inlet, in fluid communication with an interior of said settling tank for directing said solids-containing fluid into said tank, wherein said jetting fluid source and said fluid inlet are separate and discrete.

4. The settling tank apparatus as claimed in claim 1, wherein said jetting fluid is supplied directly to said hemispherical bottom of said settling tank when said solids outlet is opened or partially opened.

5. The settling tank apparatus as claimed in claim 1, wherein said jetting fluid source, when supplied with said jetting fluid and when said solids are drained from said hemispherical bottom of said tank via said solids outlet, assists in creation of or enhances the spinning of, a vortex of fluid in said hemispherical bottom of said tank.

6. The settling tank as claimed in claim 1 wherein said jetting fluid source directs said jetting fluid in a counter-clockwise direction within said hemispherical bottom of said tank, when viewed from above looking downwardly on said interior surface of said hemispherical bottom of said tank.

7. The settling tank apparatus as claimed in claim 6, wherein said jetting fluid source, when supplied with said jetting fluid and when said solids are drained from said hemispherical bottom of said tank via said solids outlet, assists in creation of, or enhances the spinning of, a counter-clockwise vortex of fluid in said hemispherical bottom of said settling tank, when viewed from above looking downwardly on said interior surface of said hemispherical bottom.

8. The settling tank apparatus as claimed in claim 1 wherein:
said cleaned fluid outlet is disposed on said tank in a non-tangential manner so as to withdraw cleaned fluid from said tank in a non-tangential manner.

9. The settling apparatus as claimed in claim 1, wherein said jetting fluid source comprises a nozzle at a distal end thereof, for providing said jetting fluid to said hemispherical bottom.

10. The settling tank apparatus as claimed in claim 1, further comprising a fluid inlet, said fluid inlet in fluid communication with an interior of said settling tank at a location above said bottom, for directing said solids-containing fluid into said settling tank.

11. The settling tank apparatus as claimed in claim 10, wherein said fluid inlet supplies said solids-containing fluid to said settling tank in a plane substantially perpendicular to said longitudinal axis and in a direction substantially tangential to said cylindrical interior surface and in a same direction as said jetting fluid supplied to said bottom.

12. The settling tank apparatus as claimed in claim 1, wherein said jetting fluid contains said solids-containing fluid.

13. A settling tank system for separating solids from a solids-containing fluid, comprising:
(a) a first, substantially vertical, cylindrical settling tank, having:
  (i) an upper substantially cylindrical portion;
  (ii) a hemispherical bottom, having a downwardly-extending concave, inwardly-curved interior surface extending downwardly from said upper substantially cylindrical portion;
  (iii) a solids outlet, in fluid communication with said hemispherical bottom of said first tank, disposed centrally of the first tank in said hemispherical bottom of the first tank at a lowermost extremity of said bottom, for draining solids from said hemispherical bottom of said first tank;
  (iv) a cleaned fluid outlet, disposed in said upper substantially cylindrical portion of said first tank and in fluid communication with said interior of said first tank, for removing fluids having reduced quantities of solids entrained therein from said first tank; and
  (v) a jetting fluid source in the form of tubing having a distal end, said distal end in fluid communication with said hemispherical bottom of said first tank and situated in an upper portion of said hemispherical bottom above said solids outlet, for directing a jetting fluid into said hemispherical bottom in a plane substantially perpendicular to a vertical axis of said first tank and in a direction substantially tangential to said downwardly-extending concave, inwardly-curved interior surface to permit introduction or augmentation of rotational swirl of fluid in said hemispherical bottom in said plane and about said vertical axis when draining solids from said solids outlet in said hemispherical bottom; and
(b) a second, substantially vertical, cylindrical settling tank, situated proximate to said first settling tank, having:
  (i) an upper substantially cylindrical portion;
  (ii) a hemispherical bottom, having a downwardly-extending concave inwardly-curved interior surface extending downwardly from said upper substantially cylindrical portion;
  (iii) a solids outlet, in fluid communication with said hemispherical bottom of said second tank, disposed centrally in said hemispherical bottom and at a lowermost extremity of the second tank, for draining solids from said hemispherical bottom of said second tank;
  (iv) a cleaned fluid outlet, disposed in said substantially cylindrical upper portion of said second tank and in fluid communication with said interior of said second tank, for removing fluids having reduced quantities of solids entrained therein from said second tank; and
  (v) a jetting fluid source in the form of tubing having a distal end, said distal end in fluid communication with said hemispherical bottom of said second tank and situated in an upper portion of said hemispherical bottom above said solids outlet, for directing a jetting fluid into said hemispherical bottom in a plane substantially perpendicular to a vertical axis of said second tank and in a direction substantially tangential to said downward-extending concave, inwardly-curved interior surface of said second tank, to permit introduction or augmentation of rotational swirl of fluid in said hemispherical bottom in said plane and about said vertical axis when draining solids from said solids outlet in said hemispherical bottom;
wherein said cleaned fluid outlet of said first tank is in fluid communication with said second tank, and said cleaned fluid outlet of said first tank supplies said fluids having reduced quantities of solids entrained therein to said second tank.

14. The settling tank system for separating solids from a solids-containing fluid as claimed in claim 13, wherein each of said first and second settling tank having a respective fluid inlet in communication with a respective interior of each of said first and second settling tank, to allow ingress of a solids-containing fluid into each of said first and second settling tanks, wherein said fluid inlet and said jetting fluid source for each of said first and second settling tank are one and the same.

15. The settling system for separating solids from a solids-containing fluid as claimed in claim 13, each of said first and second settling tank further having a respective fluid inlet in communication with a respective interior of each of said first and second settling tank, to allow ingress of a solids-containing fluid into each of said first and second settling tanks, wherein said jetting fluid source in said first settling tank is discrete and separate from said fluid inlet in said first settling tank, and said jetting fluid source in each of said first and second tanks is coupled to said bottom of said respective first and second tank, and directs said jetting fluid directly into said bottom of said tanks in a direction substantially tangential to said inwardly-curved interior surface, in a plane perpendicular to said longitudinal axis of said first and second tanks.

16. The settling tank system for separating solids from a solids-containing fluid as claimed in claim 13, each of said first and second settling tanks further having a fluid inlet separate and distinct from said jetting fluid source, wherein said fluid inlet in each of said first tank and said second tank is situated in an upper region of each of said first and second tank above said bottom, respectively, and fluid enters each of said first tank and said second tank via said fluid inlet.

17. The settling tank system for separating solids from a solids-containing fluid as claimed in claim 13, wherein said first tank further has a fluid inlet, wherein said jetting fluid source in said first tank is in fluid communication with, and said jetting fluid supplied to said jetting fluid source in said first tank, comes at least in part from, said solids-containing fluid supplied to said fluid inlet of said first tank.

18. The settling tank system for separating solids from a solids-containing fluid as claimed in claim 13, each of said first settling tank and said second settling tank having a fluid inlet, wherein said jetting fluid source in said second tank is in fluid communication with, and said jetting fluid supplied to said jetting fluid source in said second tank comes at least in part from, said solids-containing fluid supplied to said fluid inlet of said first tank.

19. The settling tank system for separating solids from a solids-containing fluid as claimed in claim 13, wherein said jetting fluid source on said first tank receives fluid from said cleaned fluid outlet of said second tank or a cleaned fluid outlet of a subsequent downstream additional settling tank downstream from said second tank.

20. The settling tank system for separating solids from a solids-containing fluid as claimed in claim 13, each of said first and second settling tank having a respective fluid inlet in communication with a respective interior of each of said first and second settling tank, to allow ingress of a solids-containing fluid into each of said first and second settling tanks, wherein said jetting fluid source in said first settling tank and said second tank is discrete and separate from said fluid inlet in each of said first and second settling tank, and said clean fluid outlet in said first tank is coupled to, and in fluid communication with, said fluid inlet in said second tank.

21. The settling tank system for separating solids from a solids-containing fluid as claimed in claim 13, wherein the clean fluid outlet in said first settling tank is coupled to, and in fluid communication with, said jetting fluid source in said second tank.

22. The settling tank system for separating solids from a solids-containing fluid as claimed in claim 13, each of said first settling tank and said second settling tank having a fluid inlet separate and discrete from said respective jetting fluid source, wherein said fluid inlet on said first settling tank receives fluid from said cleaned fluid outlet of said second settling tank or a cleaned fluid outlet of a subsequent downstream additional settling tank downstream from said second settling tank.

* * * * *